US009221569B2

(12) United States Patent
Nakamoto

(10) Patent No.: US 9,221,569 B2
(45) Date of Patent: Dec. 29, 2015

(54) BAG TRANSFER DEVICE

(71) Applicant: Toyo Jidoki Co., Ltd., Minato-ku, Tokyo (JP)

(72) Inventor: Kakue Nakamoto, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 14/615,104

(22) Filed: Feb. 5, 2015

(65) Prior Publication Data
US 2015/0217889 A1    Aug. 6, 2015

(30) Foreign Application Priority Data

Feb. 6, 2014    (JP) .................................. 2014-21204

(51) Int. Cl.
| | |
|---|---|
| B65G 47/84 | (2006.01) |
| B65G 29/00 | (2006.01) |
| B65B 43/46 | (2006.01) |
| B65G 47/86 | (2006.01) |
| B65G 17/32 | (2006.01) |
| B65B 43/50 | (2006.01) |
| B65B 59/02 | (2006.01) |

(52) U.S. Cl.
CPC .............. *B65B 43/465* (2013.01); *B65B 43/50* (2013.01); *B65B 59/02* (2013.01); *B65G 17/323* (2013.01); *B65G 29/00* (2013.01); *B65G 47/847* (2013.01)

(58) Field of Classification Search
CPC .... B65G 47/846; B65G 17/323; B65G 17/16; B65G 29/00; B65G 47/847; B65B 43/465
See application file for complete search history.

(56) References Cited

U.S. PATENT DOCUMENTS

| | | | | |
|---|---|---|---|---|
| 5,398,484 | A * | 3/1995 | Kader | B65B 43/465 198/463.2 |
| 6,662,936 | B2 * | 12/2003 | Ikemoto | B65G 37/005 141/166 |
| 7,882,685 | B2 * | 2/2011 | Koga | B65B 43/465 141/166 |
| 8,006,825 | B2 * | 8/2011 | Lenherr | B65G 29/00 198/377.07 |
| 8,151,543 | B2 * | 4/2012 | Veix | B65B 43/26 141/166 |
| 2008/0210520 | A1 * | 9/2008 | Legallais | B65G 47/847 198/470.1 |
| 2014/0331603 | A1 * | 11/2014 | Takahashi | B65B 31/06 53/408 |
| 2014/0352253 | A1 * | 12/2014 | Yamamoto | B65B 43/16 53/76 |

FOREIGN PATENT DOCUMENTS

| | | |
|---|---|---|
| JP | 5-28169 | 7/1993 |
| JP | 7-187202 | 7/1995 |
| JP | 9-95318 | 4/1997 |
| JP | 3261543 | 3/2002 |

* cited by examiner

*Primary Examiner* — Mark A Deuble
(74) *Attorney, Agent, or Firm* — DLA Piper LLP (US)

(57) ABSTRACT

A rotary bag transfer device used in a bag filling and packaging apparatus and provided with a plurality of pairs of grippers installed around an intermittently rotating table. The bag transfer device includes an arm support mechanism (21), which supports the base portion of an arm (15) of each one of the pair of grippers (13), and a drive force transmission mechanism (22), which actuates the arm support mechanism. A link (51) that is part of the drive force transmission mechanism is linked at its one end to an adjusting ring (49), a link (46) is linked at its one end to the arm support mechanism, and these links are linked together at their other ends. When the adjusting ring rotates, a center plane (M) between the grippers is displaced (for amount Da) to offset from a reference plane (N) that passes through the center (O) of the table.

8 Claims, 16 Drawing Sheets

BAG TRANSFER DEVICE

BACKGROUND OF THE INVENTION

1. Field of the Invention

The present invention relates to a bag transfer device used in bag filling and packaging apparatuses and the like and more particularly to a bag transfer device that includes a plurality of pairs of left and right grippers installed on a table rotating horizontally and a spacing adjustment mechanism provided for adjusting the spacing between the left and right grippers.

2. Description of the Related Art

Japanese Utility Model Application Publication No. H5-28169 discloses a bag transfer device that is installed in a bag filling and packaging apparatuses. This bag transfer device comprises an intermittently rotating table and a plurality of pairs of left and right grippers disposed at a constant angular spacing around the table. The left and right grippers are moved intermittently around a circular movement path when the table rotates. Each gripper has an arm and a clamping component installed at the distal end of the arm. The arms of the left and right grippers are axially supported respectively at their base portions by the table, and they are able to pivot in linear symmetry to each other within a horizontal plane.

The above-described bag transfer device includes, as a spacing adjustment mechanism for adjusting the spacing between the left and right grippers, a cylindrical cam, which is installed under the table so as to be able to move up and down, and an L-shaped lever, and it further includes a star cam and a latching pin. The center axis of the cylindrical cam coincides with the rotational axis of the table, and its upper end is the cam face. The L-shaped lever is axially supported by the table and is able to pivot in a vertical plane; and it has at one end a cam follower that rotates over the cam face of the cylindrical cam and also has at another end a press roller that comes into contact with the tail end of the arm and causes the arm to pivot. The star cam is rotated coaxially with the table. Also, the star cam can be rotated relative to the table and further can be positioned at a position after it has been rotated by a suitable angle. The latching pin is fixed to the arm.

In the above-described bag transfer device, while the table intermittently is rotating, the cam follower rotates over the cam face and moves up and down according to the shape (protrusion) of the cam face, which is accompanied by the opening and closing motions of the arms of the left and right grippers, so that the spacing between the left and right grippers (and especially the spacing between the clamping components) increases or decreases within a specific range. When the spacing between the left and right grippers decreases to a specific value, the latching pin comes into contact with the star cam. The maximum spacing of the left and right grippers is determined by the maximum height of the cam face of the cylindrical cam, and the minimum spacing of the left and right grippers is restricted by the star cam.

When the bag size (and particularly the bag width) is changed (or bags of different sizes are processed by bag transfer device), the maximum and minimum spacing of the left and right grippers has to be adjusted to match the width of the changed (or different) bag. This can be done by raising or lowering the cylindrical cam and rotating the star cam relative to the table.

Japanese Patent Application Laid-Open (Kokai) No. H9-95318 is similar to Japanese Utility Model Application Publication No. H5-28169, and it discloses also a bag transfer device. This bag transfer device includes an intermittently rotating table and a plurality of pairs of left and right grippers disposed at a constant angular spacing around the table. In this bag transfer device, instead of the cylindrical cam and star cam of Japanese Utility Model Application Publication No. H5-28169, a bag width setting cam and an offset width adjustment cam are employed as a spacing adjustment mechanism for adjusting the spacing of the left and right grippers. The offset width is the distance that the clamping components of the grippers are moved, during the process of the table making its intermittent rotation, between the widest and narrowest spacing of the left and right grippers, and it is equal to one-half the difference between the maximum and minimum values for the spacing of the left and right grippers.

Japanese Patent No. 3,261,543 discloses a bag transfer device that is installed in a spout attachment and filling apparatus, and this bag transfer device comprises an intermittently rotating table and a plurality of pairs of left and right grippers disposed at a constant angular spacing around the table. In this spout attachment and filling apparatus, a method for manufacturing spouted bags (bags provided with spouts, and bags are filled with contents in this example) is executed in which flat bags, gusset bags, or the like that are square in top view are supplied to the left and right gripper pairs, and these bags are transferred intermittently along with the movement of the grippers while a corner at the upper end of each bag is cut off at an angle, spouts are attached to the cut corners of the bags, nozzles are inserted into the horizontal portions of the bag mouths, and then the bags are filled with a liquid through the nozzles. A spout that is thus attached to the angled corner of a square bag is called a corner spout, and this bag with a spout attached thereto is called a corner spouted bag.

Japanese Patent Application Laid-Open (Kokai) No. H7-187202 is similar to Japanese Patent No. 3,261,543 in that it also discloses a bag transfer device which is installed in a spout attachment and filling apparatus and comprises an intermittently rotating table and a plurality of pairs of left and right grippers disposed at a constant angular spacing around the table. In this spout attachment and filling apparatus, a method for manufacturing spouted bags (filled bags in this example) is executed in which bags are supplied to the left and right gripper pairs, and these bag are moved intermittently by the movement of the grippers while nozzles are inserted into the bag mouths and the bags are filled with a liquid, and then spouts are attached to the center parts of the horizontal bag mouths. A spout that is thus attached to the center part of a substantially horizontal mouth of a bag that is substantially square is called a center spout, and this bag is called a center spouted bag.

In the bag transfer device disclosed in Japanese Utility Model Application Publication No. H5-28169, the supply of bags to the grippers, the opening of the bag mouth, the filling of the bag with its contents, the sealing of the open part of the bag, the cooling of the sealed part of the bag, the removal of the sealed bag from the grippers, and other bag filling steps are carried out in order at various stop positions of the left and right grippers of the bag transfer device. A bag feed device, a bag opening device, a bag filling device, a bag sealing device, a bag cooling device, and so forth that perform the above steps are provided at various stop positions where the left and right grippers are stopped. All of the pairs of left and right grippers installed around the table are respectively disposed symmetrically with respect to a vertical plane that passes through the rotational center (axis) of the table, and these grippers are rotated intermittently along the movement path while this symmetrical layout is substantially maintained, with the spacing between them being increased or decreased as they are moved. The above-described vertical plane is called a reference plane in the present invention, and a layout state in which the left and right grippers are disposed symmetrically with respect to this reference plane is called a reference layout.

In such a bag filling and packaging apparatus as disclosed in Japanese Utility Model Application Publication No. H5-28169, generally, the various devices are installed at various stop positions, using the reference plane as a reference. More specifically, the bag feed device is, for example, installed so that the center line (a straight line that passes through the center in the bag width direction) of a bag supplied to the left and right grippers is located on the reference plane, the bag opening device is installed so that the pair of suction cups are moved back and forth on the reference plane, and the liquid filling device is installed so that a filling nozzle moves up and down on the reference plane.

In this bag filling and packaging apparatus, when a bag 1 (see FIG. 6A) that is open at the top and is rectangular in top view (as disclosed in Japanese Utility Model Application Publication No. H5-28169 and Japanese Patent Application Laid-Open (Kokai) No. H9-95318) is filled with a liquid, the center line CO of the bag 1 supplied by the bag feed device to the left and right grippers (only the clamping components 2 are shown) is located on a reference plane N. Then, when the grippers (clamping components 2) are stopped at the stop position where the opening step is performed, suction cups 3 are moved forward so as to come in contact with the surface of the bag 1 as indicated by two-dot chain lines in FIG. 6A, and this suction position is on the center line CO of the bag 1 (on the reference plane N). In the filling step as well, the filling nozzle are also moved up and down on the center line CO (on the reference plane N).

An example in which this bag filling and packaging apparatus is used so that a bag 4 shown in FIG. 6B, for example, instead of the bag 1, is filled with a liquid. The bag 4 is a corner spouted bag, and a spout 5 has been attached to the corner, which was cut at an angle. After being supplied by the bag feed device to the left and right grippers (the clamping components 2), the center line CO of the bag 4 is located on the reference plane N, but the center line C of the open part 6 at the top of the bag is offset from the reference plane (offset width G). When the grippers (the clamping components 2) are stopped at the stop position where the bag opening step is performed, the suction cups 3 are moved forward and come into contact with both surfaces of the bag 4 as indicated by the two-dot chain line in FIG. 6B, this suction position being on the center line CO of the bag 3 (on the reference plane N); and since the suction position is offset by the offset width G from the center line C of the open part 6, there is interference (difficulty) during the opening of the open part 6. Also, in the filling step, the filling nozzle are moved up and down on the center line CO (on the reference plane N), which is offset by the offset width G from the center line C of the open part 6, so that interference (difficulty) occurs during the insertion of the filling nozzle into the open part 6. In FIG. 6B, the height direction position of the bag 4 supplied to the grippers (the clamping components 2) and the height direction position of the suction cups 3 are adjusted depending on the bags 4.

If the horizontal position of the suction cups 3 is adjusted so that the suction cups 3 are moved onto the center line C of the open part 6, then there will be no interference (difficulty) during opening of the open part 6. Also, if the horizontal position of the filling nozzle is adjusted so that this filling nozzle are moved up and down on the center line C of the open part 6, then there will be also no interference (difficulty) during insertion of the nozzle into the open part 6 of the bag.

However, these adjustments of the horizontal position must be performed not only for the bag opening device and the bag filling device but also for any other subsequent (or downstream side) devices; and if the type of bag being processed changes to an ordinary flat bag from a spouted bag, it will be necessary to adjust back to the original reference plane N, and this can lead to a significant drop in the productivity of the bag filling and packaging apparatus.

One example of a bag filling and packaging apparatus that is for bags having spouts at corners such as these as described above is Japanese Patent Application Laid-Open (Kokai) No. 2009-220853.

In this spout attachment and filling apparatus disclosed in Japanese Patent No. 3,261,543, the supply of bags to the grippers, the corner cutting of the bag mouth, the opening of the bag mouth, the insertion of the spout into the bag mouth, the temporary sealing of the spout, the main sealing of the bag and spout, the cooling of the sealed part, the removal of the spouted bag from the grippers, and other such spout attachment steps are carried out in order at various stop positions of the left and right grippers of the bag transfer device. In the device of this Japanese Patent No. 3,261,543, filling with a liquid, sealing the open part, and so forth are carried out after the main sealing of the bag and spout is done; and in the description below in regards to this device, the steps after filling will not be considered (hereinafter the spout attachment and filling apparatus is referred to as a spout attachment device).

In this spout attachment device of Japanese Patent No. 3,261,543 as well, the layout of the left and right grippers of the bag transfer device is the reference layout described above. When, in this spout attachment device, a spout 8 (see FIG. 7A) is to be attached to the center of the open part 7 at the upper end of a bag 1 that is rectangular in the top view, the bag feed device, the opening device, the spout insertion and temporary sealing device, the spout main sealing device, the seal cooling device, and so forth that perform the above steps are installed at various stop positions so that the reference plane described above as a reference. More specifically, the bag feed device, for example, is installed so that the center line CO, which passes through the center in the width direction of the bag 1 supplied to the grippers 2 (the clamping components 2), is located in the reference plane N, the opening device is installed so that a pair of suction cups 3 are moved back and forth over the reference plane N, and the spout insertion and temporary sealing device is installed so that the spout 8 descends over the reference plane N and is inserted into the open part 7 of the bag 1.

A case will be considered below in which this spout attachment device is used to clamp the edges of the bag 9 shown in FIG. 7B, for example, with grippers (clamping components 2) so that a corner opening 11 that has been cut at an angle is horizontal, and a spout 8 is attached in the center of the corner opening 11. As seen from FIG. 7B, the horizontal position of the bag 9 supplied from the bag feed device to the grippers (the clamping components 2) is adjusted so that the clamping margin for the grippers (the clamping components 2) is substantially even on the left and right sides. In this case, first, in the opening step, the horizontal position of the suction cups 3 (on the reference plane N) deviates from the center line C of the corner opening 11 (with offset width H), and in the step of inserting and temporarily sealing the spout 8, the horizontal position of the spout 8 (on the reference plane N) deviates from the center line C of the corner opening 11 (offset width H). Accordingly, the spout 8 cannot be attached at the proper position.

If the horizontal position of the suction cups 3 is adjusted so that the suction cups 3 are moved onto the center line C of the corner opening 11, then there will be no interference (difficulty) during the opening of the corner opening 11. Also, if the horizontal position of the spout 8 is adjusted so that the insertion position of the spout 8 is on the center line C and the temporary sealing position is also on the center line C, then there will be no interference (difficulty) during the insertion of the spout 8 into the bag 9 or its temporary sealing.

However, this adjustment must be performed not only for the opening device and the spout insertion and temporary sealing device, but also for any other subsequent devices, and if the spouted bag to be processed changes from a corner spouted bag to a center spouted bag, then it will be necessary to adjust the above-described devices back to the original reference plane N, and this adjustment work can lead to a significant productivity drop of the spout attachment device. Furthermore, if a corner spouted bag is clamped by the grippers so that the corner opening is horizontal, then a difference in the angle at which the corner is cut will change the offset width H, so the above-described adjustment of the opening device, the spout attachment and temporary sealing device, and any subsequent devices will also need to be performed when the bag is changed to one with a different cut angle.

BRIEF SUMMARY OF THE INVENTION

The present invention is made in light of the above-described problems encountered with existing bag filling and packaging apparatuses, spout attachment devices, and so forth, and it is an object of the present invention to provide a bag transfer device that can reduce the number of adjustments and raises the productivity of bag filling and packaging apparatuses, spout attachment devices, and so forth, when a bag that is to be filled in a bag filling and packaging apparatus is changed from one, in which the center line of the open part coincides with the center line in the width direction of the bag, to another, in which the center line of the open part is offset from the center line in the width direction of the bag, and when the opposite change is made; and also when a spouted bag manufactured in a spout attachment device is changed from a center spouted bag to a corner spouted bag, and when the opposite change is made, and so on.

The above object is accomplished by a unique structure of the present invention for a bag transfer device,
which includes:
a table that intermittently rotates by a constant angle around a vertical axis thereof within a horizontal plane,
a plurality of pairs of left and right grippers that are disposed around the table and moved along a circular movement path as the table rotates, and
a spacing adjustment mechanism that increases or decreases the spacing, within the horizontal plane, of the left and right grippers while the plurality of pairs of left and right grippers are being moved along the movement path; and
in which
each gripper is comprised of an arm and a clamping component installed at a distal end of the arm,
the clamping components of the left and right grippers clamp the left and right sides of a bag, and
the bag is transferred along a circular transfer path;
wherein
the spacing adjustment mechanism comprises:
an arm support mechanism disposed at each arm of the left and right grippers,
a drive force transmission mechanism that operates the arm support mechanisms, and
a gripper layout adjustment mechanism that adjusts the layout of the left and right grippers using a vertical plane that passes through the above-described axis of the table as a reference plane; and
the gripper layout adjustment mechanism sets:
a reference layout in which the left and right grippers are laid out opposite each other and spaced apart equally (in distance) with the reference plane in between, or
an eccentric layout in which the grippers are laid out opposite each other at mutually different spacings (or different distance) with the reference plane in between.

In the above-described bag transfer device of the present invention, depending on the operation of the gripper layout adjustment mechanism, there can be (a) a case in which only one of the left and right grippers operates, and (b) a case in which the arm support mechanisms of the left and right grippers operate in the same direction.

A specific example of the configuration of the gripper layout adjustment mechanism and the drive force transmission mechanism will now be given below.

In the case (a) above,
the gripper layout adjustment mechanism comprises:
an adjustment ring that is installed on the table and is rotated intermittently along with the table and that is capable of rotating relative to the table around the axis of the table, and
a ring drive mechanism that rotates the adjustment ring;
a pair of first links is provided so that one end of each one of the first link is, as part of the drive force transmission mechanism, linked to the arm support mechanism of each one of the left and right grippers; and
a pair of second links is provided so that one end of each one of the second links is linked to another end of each one of the first links, with another end of one of the second links being linked to the adjustment ring and another end of another one of the second links being linked to the table.

In this structure, when the ring drive mechanism is operated, the adjustment ring is rotated, and drive force caused thereby is transmitted through said one of the second links and the first link linked thereto to one of the arm support mechanisms, so that the arm support mechanism is operated, and the layout of the left and right grippers is adjusted.

The terms "first" and "second" here are merely appended for the sake of differentiation.

In the case (b) above, the gripper layout adjustment mechanism comprises:
an adjustment ring that is installed on the table and is rotated intermittently along with the table and that is capable of rotating relative to the table around the axis of the table, and
a ring drive mechanism that rotates the adjustment ring;
a pair of first links is provided so that one end of each one of the first link is, as part of the drive force transmission mechanism, linked to the arm support mechanism of each one of the left and right grippers; and
a pair of second links is provided so that one end of each one of the second links is linked to another end of each one of the first links, with another end of each one of the second links being linked to the adjustment ring.

In this structure, when the ring drive mechanism is operated, the adjustment ring is rotated, and drive force caused thereby is transmitted through the second links and the first links to each one of the arm support mechanisms, so that each one of the arm support mechanisms is operated, and the layout of the left and right grippers is adjusted.

A specific example of the configuration of the spacing adjustment mechanism will be given below.

The spacing adjustment mechanism includes: a cylindrical cam that is installed under the table, is capable of moving up and down, and whose center coincides with the axis.

The drive force transmission mechanism comprises:
- a pivot lever that is linked at an intermediate position thereof to the table and is capable of pivoting within a horizontal plane;
- a cam lever that is disposed between the cylindrical cam and the pivot lever, is axially supported in an intermediate position by the table, has at one end thereof a cam follower that rotates over the cam face of a cylindrical cam along with the rotation of the table, and has another end that comes into contact with one end of the pivot lever;
- a third link that is provided more to the outer peripheral side of the table than the pivot lever and is linked at one end thereof to the table and is able to pivot within a horizontal plane;
- a fourth link that is linked at one end thereof to the other end of the pivot lever and is linked at another end thereof to the other end of the third link; and
- a pair of fifth links with each one of the links being linked at one end thereof to the intermediate position of the fourth link and at another end thereof to the other end of the first link.

When the cam follower of the cam lever rotates over the cam face of the cylindrical cam, drive force caused thereby is transmitted through the drive force transmission mechanism to the first link. The terms "third" to "fifth" here are merely appended for the sake of differentiation.

The above-described bag transfer device can also be applied to a so-called double bag transfer device (see Japanese Patent Application Laid-Open (Kokai) No. 2004-244085, for example). In such a double bag transfer device,
- an even number of pairs of left and right grippers are provided,
- the clamping surface of the clamping components of two adjacent pairs of left and right grippers lie in substantially the same horizontal plane, and
- the spacing between the left and right grippers, which are of one pair of grippers of two adjacent pairs of grippers, and the spacing between the left and right grippers, which are of another pair of grippers of the two adjacent pairs of grippers, are increased or decreased in a horizontal plane at the same time.

In this configuration,
- the grippers of two adjacent pairs of left and right grippers have (share) a common drive force transmission mechanism,
- a first connecting link is provided to connect:
  - the arm support mechanism of the gripper, which is of one pair of grippers of adjacent two pairs of grippers and on a downstream side of the movement path, to
  - the arm support mechanism of the gripper, which is of another one pair of grippers of adjacent two pairs of grippers and on a downstream side of the movement path;
- a second connecting link is provided to connect:
  - the arm support mechanism of the gripper, which is of one pair of grippers of adjacent two pairs of grippers and on an upstream side of the movement path, to
  - the arm support mechanism of the gripper, which is of another one pair of grippers of adjacent two pairs of grippers and on an upstream side of the movement path; and
- two adjacent pairs of left and right grippers are moved in the same manner.

According to the present invention as described above, when the bags that are to be filled with contents in a bag filling and packaging apparatus are changed from those in which the center of the open part coincides with the center in the width direction of the bag to those in which the center of the open part is offset from the center in the width direction of the bag, or when the opposite change is made; when, in manufacturing a spouted bag by a spout attachment device, a center spouted bag is changed to a corner spouted bag, or when the opposite change is made; or the like, the gripper layout adjustment mechanism is operated, so that all of the pairs of left and right grippers simultaneously change their layout with respect to the reference plane, and either the reference layout or an eccentric layout can be employed as needed. Also, when an eccentric layout is employed, the degree of eccentricity (the magnitude of the spacing between the reference plane and the center plane of the left and right grippers) can also be set as desired within a specific range. Accordingly, the adjustments of the devices used at the various stop positions are reduced or eliminated, which boosts the productivity of bag filling and packaging apparatuses, spout attachment devices, or the like.

DETAILED DESCRIPTION OF THE INVENTION

A bag transfer device pertaining to the present invention will be described below in specific terms with reference to FIGS. 1 to 16.

Figure 1:
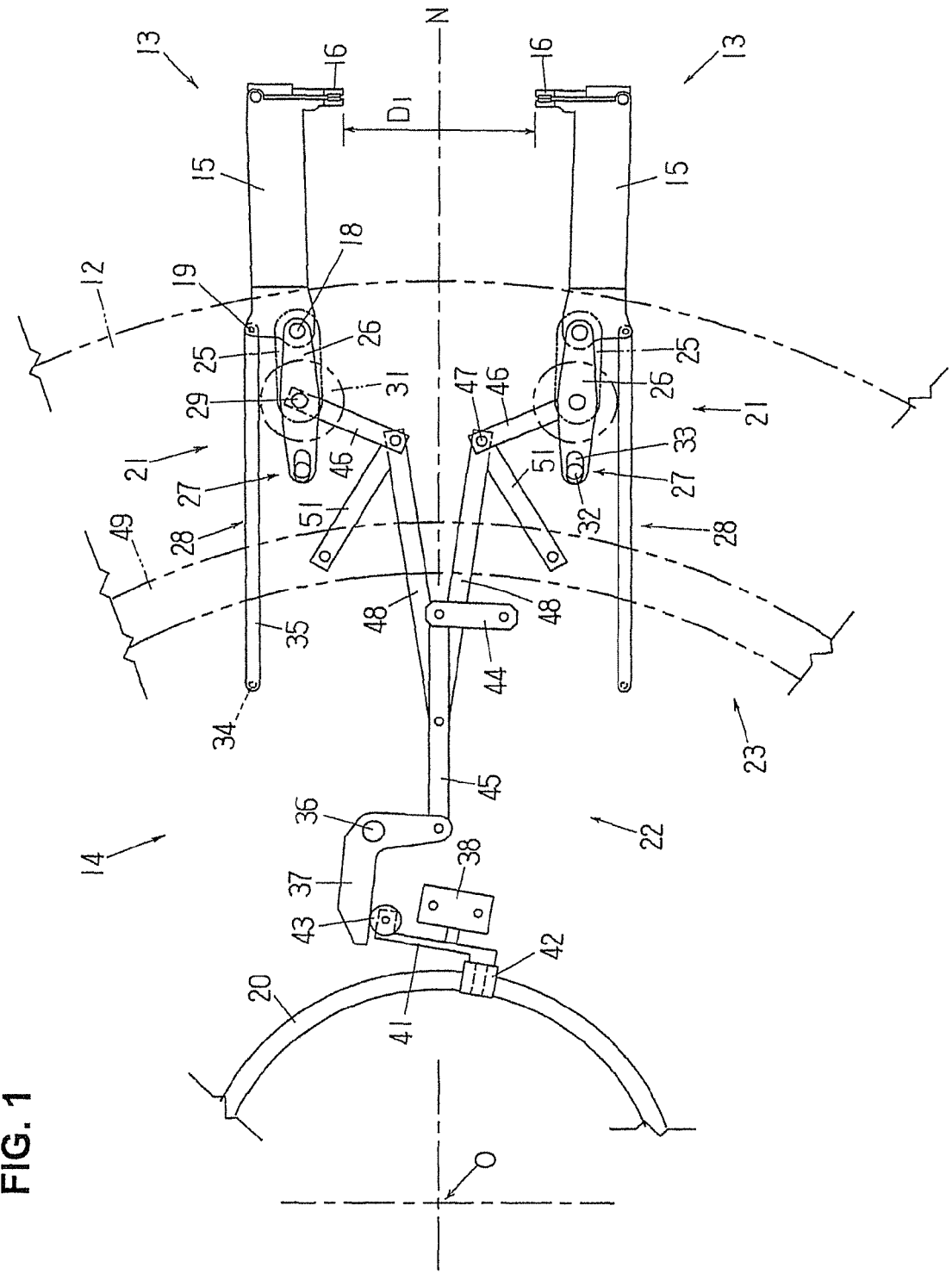
FIG. 1 is a partial top view of a bag transfer device according to the present invention, in which members disposed under the table are drawn by solid lines.
Figure 2:
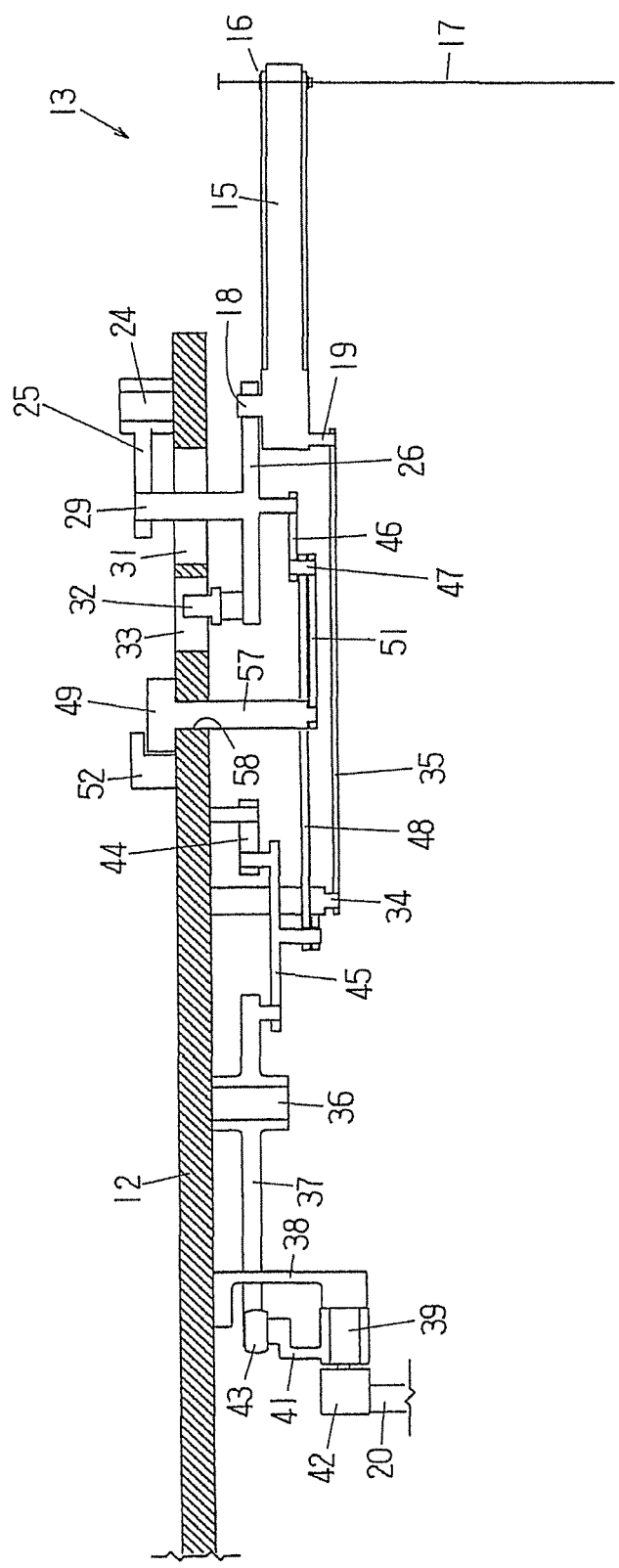
FIG. 2 is a partially cross-sectional partial side view of the bag transfer device shown in FIG. 1.
Figure 3:
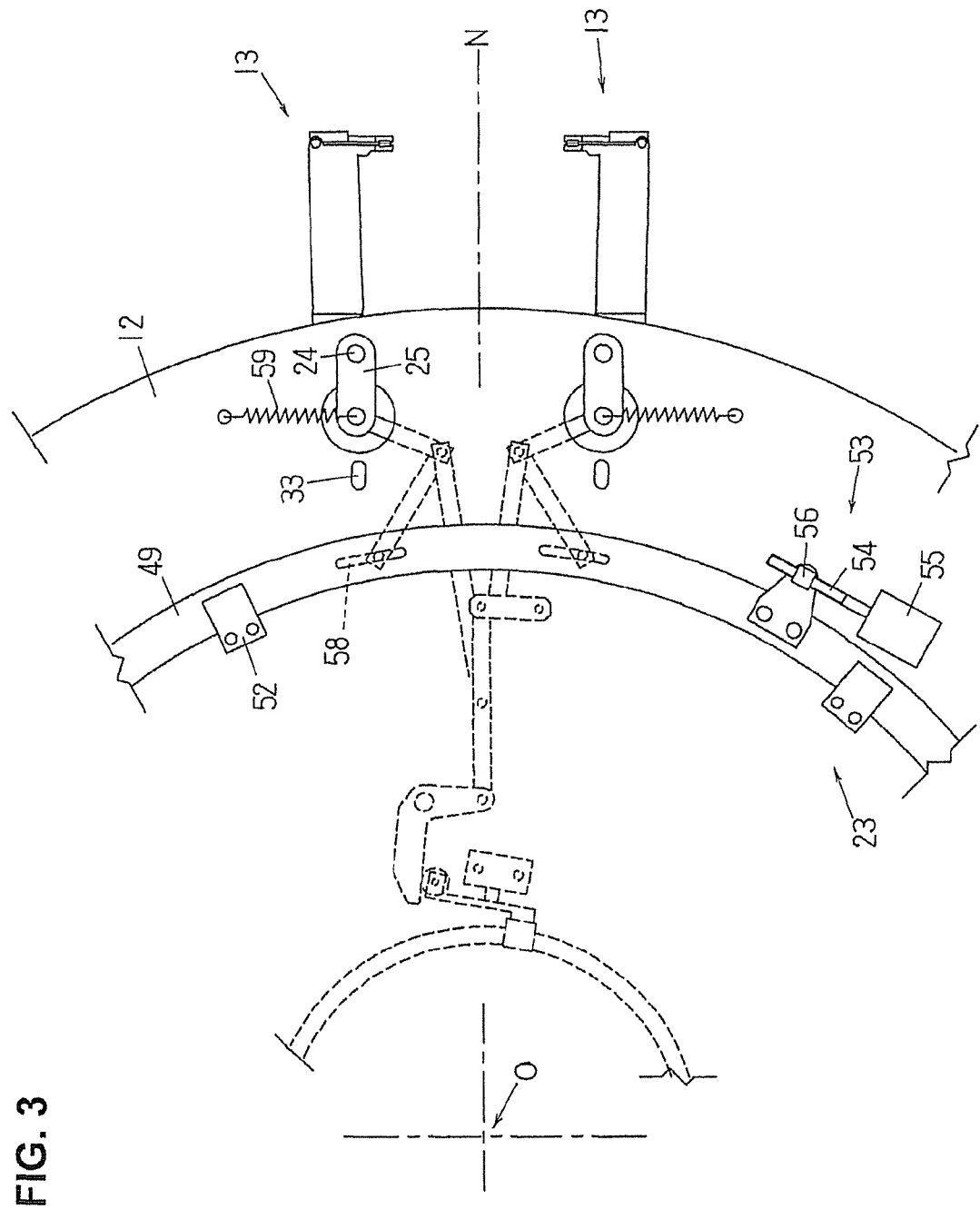
FIG. 3 is a partial top view of the bag transfer device shown in FIGS. 1 and 2, in which members disposed above the table are mainly illustrated.

FIGS. 1 to 3 show a bag transfer device applied to, for example, a rotary-type bag filling and packaging apparatus (see Japanese Utility Model Application Publication No. H5-28169).

This bag transfer device of the present invention is similar to the bag transfer device disclosed in Japanese Utility Model Application Publication No. H5-28169, and it comprises: a round table 12 that rotates intermittently at a constant angle within a horizontal plane; a plurality of pairs of left and right grippers 13 that are disposed at a constant-angle spacing around the table 12 (the angle is the same as the angle at which the table 12 rotates each time) and moved along a circular movement path; and a spacing adjustment mechanism 14 that increases or decreases the spacing of the left and right grippers 13 while the left and right grippers 13 are being moved along the movement path.

In FIGS. 1 to 3, the left and right grippers 13 are each composed of an arm 15 and a clamping component 16 provided at the distal end of the arm 15. The left and right edges of a bag 17 (see FIG. 2) are clamped by these clamping components 16, and as the left and right grippers 13 are moved along the movement path, the bag 17 is transferred along the circular transfer path. If the bag 17 is, for example, a flat bag disclosed in Japanese Utility Model Application Publication No. H5-28169, which is rectangular in top view (sealed on three sides and open above), the left and right grippers 13 are disposed in symmetry with respect to a vertical plane N that is perpendicular to a tangent to the movement path or the transfer path (see FIG. 1, the vertical plane passing through the axis O of the table 12), and the spacing between the grippers 13 increased or decreased symmetrically with respect to the vertical plane N as the bag is being transferred along the movement path. This layout (location) of the left and right grippers 13 in FIG. 1 is called a "reference layout" in the present invention, and the vertical plane N is called a "reference plane" (herein after referred to as the reference plane N). It should go without saying that the all of the pairs of left and right grippers 13 installed on the table 12 assume this reference layout.

At the base portion of each arm 15, a first support component (first support shaft 18) and a second support component (second support shaft 19) are provided. An imaginary vertical plane that passes through the centers of these first and second support shafts 18 and 19 is parallel to the clamping faces of the clamping components 16 (or parallel to the width direction of the bag 17 clamped by the clamping components 16), and the first support shaft 18 and the second support shaft 19 are separated by a specific distance in the horizontal direction within this vertical plane.

A cylindrical cam 20 is provided under the table 12. The center of the cylindrical cam 20 coincides with the axis O of the table 12, and this cylindrical cam 20 is able to move up and down and has an upper end that makes a cam face. The cylindrical cam 20 rotates by the same angle and in synchronization with the intermittent rotation of the table 12, and it rotates back by the same angle and returns to its original position when the table 12 stops its rotation.

The bag transfer device further includes a drive source for intermittently driving the table 12, a drive source for raising and lowering the cylindrical cam 20, and a drive source for rotating the cylindrical cam 20 forward and backward (none of these drive sources is shown in the drawings).

In the above structure, the cam face of the cylindrical cam 20 is formed to face upward at the upper end. However, the can surface instead be formed so as to face downward at the lower end of the cylindrical cam 3 (in this case the direction in which the force of a biasing member (discussed below) is exerted is reversed). Also, no drive source can be installed for raising and lowering the cylindrical cam 20, and the raising and lowering can be accomplished manually using, for instance, a handle.

The spacing adjustment mechanism 14 is cam-driven; and it, in addition to the cylindrical cam 20, comprises: arm support mechanisms 21 disposed for the various arms 15, a drive force transmission mechanism 22 that actuates the arm support mechanisms 21, and a gripper layout adjustment mechanism 23. The drive force transmission mechanism 22 is provided for each pair of grippers 13, while the gripper layout adjustment mechanism 23 is provided to be shared by all of the pairs of the grippers 13.

The arm support mechanisms 21 of the spacing adjustment mechanism 14 is formed for each one of the arms 15 by: a link 25 that is linked at one end thereof to a shaft 24 protruding on the table 12 (see FIG. 2) and is pivotable in a horizontal plane (this link being hereinafter referred to as the sixth link 25), a link 26 that is linked at one end thereof to the first support shaft 18 and is linked at its center to the other end of the sixth link 25 (this link being hereinafter referred to as the seventh link 26), a first restricting mechanism 27 that restricts the movement direction of the other end of the seventh link 26, and a second restricting mechanism 28 that restricts the movement direction of the second support shaft 19. The other end of each of the sixth links 25 and the center of each of the seventh links 26 are linked via a vertical shaft 29, and the shafts 29 are disposed in holes 31 formed in the table 12.

The first restricting mechanism 27 of the arm support mechanisms 21 restricts the movement direction of the other ends of the seventh links 26 so that the other ends are moved parallel to the reference plane N (substantially perpendicular to the width direction of the bag 17 clamped by the clamping components 16). Each of the first restricting mechanisms 27 comprises a sliding member 32 installed at the other end of the seventh link 26 and a slot 33 made in the table 12. The slots 33 are formed parallel to the reference plane N, and the sliding members 32 of the first restricting mechanisms 27 are respectively fitted in the slots 33 so as to be slidable along the slots 33.

The sixth link 25, the seventh link 26, and the first restricting mechanism 27 constitute a Scott-Russell mechanism; and when the other end of the seventh link 26 (the sliding member 32) is moved parallel to the reference plane N, the one end (the first support shaft 8) of the seventh link 26 is moved perpendicular to the reference plane N.

The second restricting mechanism 28 of each one of the arm support mechanisms 21 restricts the movement direction of the second support shaft 19 so that the movement direction is substantially perpendicular to the reference plane N, and it comprises a restricting link 35, which is linked at one end thereof, on the side nearest the center of the table 12, to the table 12 via a shaft 34 in a pivotable fashion within a horizontal plane. The restricting link 35 extends substantially parallel to the reference plane N and is linked at its other end to the second support shaft 19. The movement path of the second support shaft 19 is arc-shaped, and its movement direction is not perpendicular in a strict sense to the reference plane N; however, if the length of the restricting link 35 is set longer, the movement path will be an arc of a larger diameter (thus approximating a straight line), and the movement direction can be brought closer to being perpendicular (substantially perpendicular) to the reference plane N.

The drive force transmission mechanism 22 of the spacing adjustment mechanism 14 comprises a pivot lever 37 and a cam lever 41. The pivot lever 37 is rotatably linked at an intermediate position thereof to a shaft 36 fixed to the table 12 and is pivotable in a horizontal plane. The cam lever 41 (see the L-shaped lever 14 in Japanese Utility Model Application Publication No. H5-28169) is disposed between the cylindrical cam 20 and the pivot lever 37, and it is rotatably linked at an intermediate position thereof to the shaft 39 of a bracket 38 fixed to the table 12 and is pivotable in a vertical plane. The cam lever 41 has at one end thereof a cam follower 42 that rotates over the cam face of the cylindrical cam 20 as the table 12 rotates, and it has at the other end a roller 43 that comes into contact with one end of the pivot lever 37.

The drive force transmission mechanism 22 further comprises a link 44 (hereinafter referred to as the third link 44), a link 45 (hereinafter referred to as the fourth link 45), a pair of links 46 (hereinafter referred to as the first links 46), and a pair of links 48 (hereinafter referred to as the fifth links 48). The link 44 (or the third link 44) is provided more to the outer peripheral side of the table 12 than the pivot lever 37, and it is linked at one end thereof to the table 12 and is pivotable in a horizontal plane. The link 45 (or the fourth link 45) extends along the reference plane N between the pivot lever 37 and the third link 44, and it is linked at one end thereof to the other end of the pivot lever 37 and at another end thereof to the other end of the third link 44. Each one of the pair of links 46 (or the first links 46) is linked at one end thereof to an intermediate position of the seventh link 26 of each one of the arm support mechanisms 21. Each one of the pair of links 48 (or the fifth links 48) is linked at one end thereof to an intermediate position of the fourth link 45 and at another end thereof to the other end (the shaft 47) of the first link 46.

The length from the shaft 36 of the pivot lever 37 to the other end (the part linked to the fourth link 45) is set to be the same as the length from one end (the point linked to the table 12) to another end (the point linked to the fourth link 45) of the third link 44.

As part of the drive force transmission mechanism 22, a pair of links 51 (hereinafter referred to as the second links 51) is provided. Each one of the second link 51 is linked at one end thereof to an adjusting ring 49 and at another end thereof to the other end of the first link 46 (which is also the other end of the fifth link 48) at the shaft 47. The second links 51 are also a part of the gripper layout adjustment mechanism 23.

As is shown clearly in FIG. 3, the adjusting ring 49 that rotates intermittently together with the table 12 and whose center coincides with the axis O of the table 12 is installed on the table 12. The adjusting ring 49 is guided by a plurality of guide members 52 disposed on the table 12 and rotated relatively with respect to the table 12. A drive mechanism 53 that rotates the adjusting ring 49 is installed on the table 12. The drive mechanism 53 comprises a motor 55 whose output shaft is a threaded shaft 54, and a nut member 56, which is installed on the adjusting ring 49. The threaded shaft 54 meshes with the nut member 56; and thus when the threaded shaft 54 is rotated, the nut member 56 is moved, and thus the adjusting ring 49 is rotated while sliding over the table 12.

As seen from FIG. 2, the adjusting ring 49 and the second link 51 are linked by a shaft 57 that passes (penetrates) through the table 12 above and below (or vertically). As seen from FIG. 3, an arc-shaped slots 58 into which the shafts 57 are fitted respectively are formed in the table 12. When the adjusting ring 49 is rotated around the axis O, the shafts 57 slide in the slots 58 and rotate around the axis O.

Furthermore, as part of the drive force transmission mechanism 22, biasing members (tension spring 59) are provided on the table 12. Each of the tension springs 59 is connected at one end thereof to the table 12 and at another end thereof to the sixth link 25, and it presses the cam follower 42 of the cam lever 41 against the cam face of the cylindrical cam 20.

The gripper layout adjustment mechanism 23 is comprised of the above-described adjusting ring 49, the drive mechanism 53, and the pair of second links 51.

When the layout of the left and right grippers 13 is the reference layout (the layout state shown in FIGS. 1 and 3), the first links 46, the second links 51, and the fifth links 48 are disposed symmetrically with respect to the reference plane N.

In FIG. 1, the spacing between the grippers 13 (the spacing between the clamping components 16) is labeled D1. The clamping faces of the clamping components 16 of the grippers 13 lie in a vertical plane that is perpendicular to the reference plane N. The width direction of a bag 17 clamped by the left and right clamping components 16 is perpendicular to the reference plane N.

In the above described structure of the bag transfer device of the present invention, when the cylindrical cam 20 ascends and descends, the cam follower 42 of the cam lever 41 also ascends and descends, the cam lever 41 thus pivots in a vertical plane, the pivot lever 37 pivots in a horizontal plane, the fourth link 45 is moved substantially along the reference plane N, and drive force caused thereby is transmitted to the left and right seventh links 26, which are part of the Scott-Russell mechanism (consisting of the sixth link 25, the seventh link 26, and the first restricting mechanism 27), via the fifth links 48 and the first links 46. The shafts 47, which are the connecting points of the first links 46, the fifth links 48, and the second links 51, are restrained by the second links 51 so as to make arc-shaped movements. Also, the various pairs of the seventh links 26, the first links 46, and the fifth links 48 are moved symmetrically with the reference plane N in between them.

The other ends (the sliding members 32) of the seventh links 26 are restricted by the first restricting mechanisms 27 so that their movement direction is parallel to the reference plane N. Accordingly, one end (the first support shaft 18 of the arm 15) of each one of the seventh links 26 is moved perpendicular to the reference plane N. This movement direction can also be considered to be the tangential direction of the transfer path of the bag 17 clamped by the clamping components 16.

As the first support shafts 18 of the arms 15 are moved, the second support shafts 19 of the arms 15 are also moved. As discussed above, the movement direction of the second support shafts 19 at this point is substantially perpendicular to the reference plane N.

The first support shaft 18 and the second support shaft 19 that support the base portions of the arms 15 are moved perpendicular and substantially perpendicular to the reference plane N, and consequently the arms 15 are moved substantially perpendicular to the reference plane N, which is accompanied by a change in the spacing between the grippers 13 (the spacing between the clamping components 16).

Figure 4:
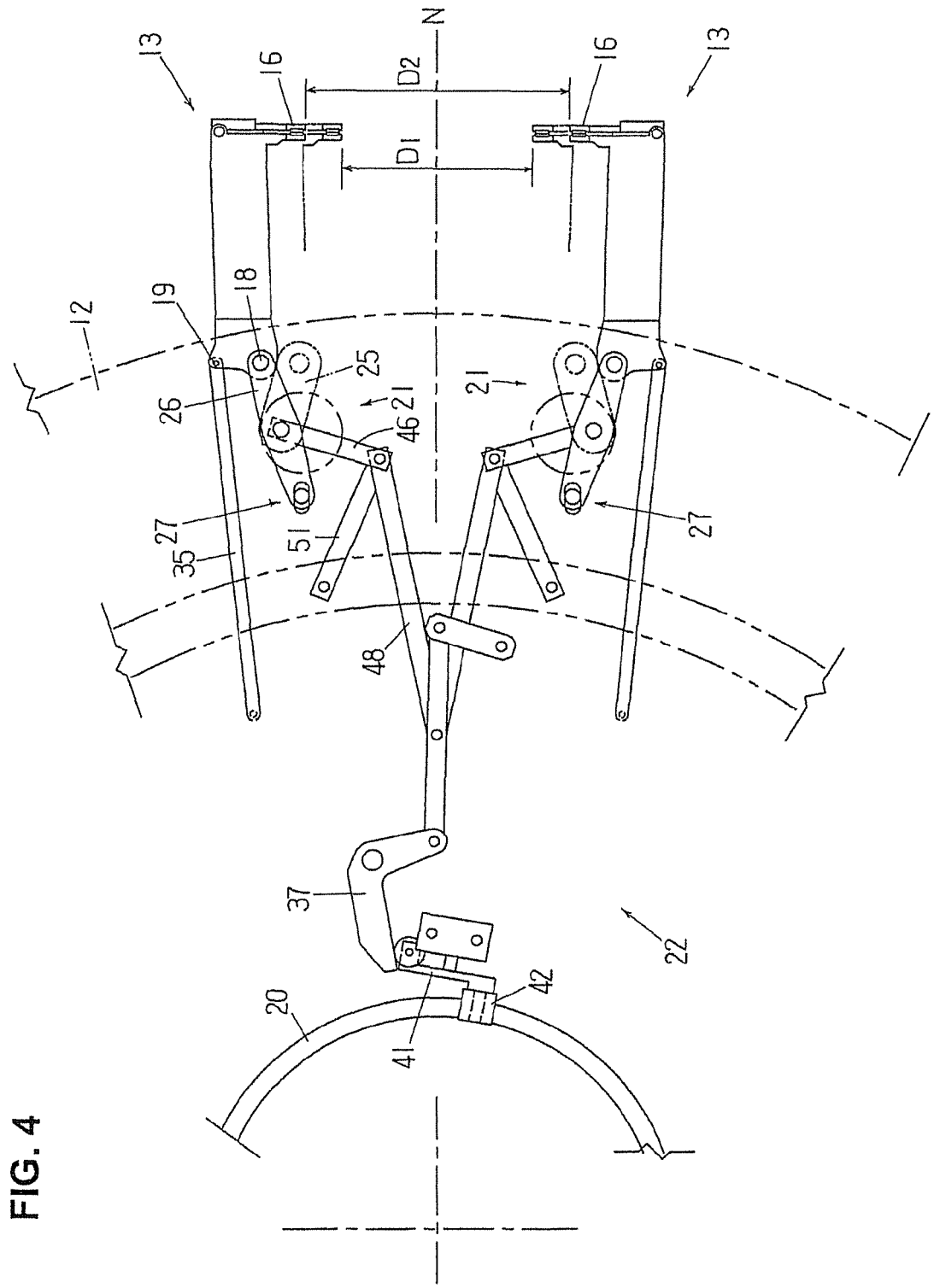
FIG. 4 is a partial top view of the bag transfer device shown in FIGS. 1 to 3 and illustrates the action of a spacing adjustment mechanism thereof for left and right grippers.

FIG. 4 shows the positions of the various levers and links, and the positions of the grippers 13, when the cylindrical cam 20 has been lowered by a specific height. The left and right grippers 13 are moved symmetrically with the reference plane N in between them, and the spacing between the grippers 13 (the clamping components 16) increases from D1, which is indicated by a two-dot chain line, to D2, which is indicated by a solid line. Even though the spacing between the grippers 13 (the clamping components 16) increases, the clamping faces of the clamping components 16 are maintained in substantially the same plane (a plane substantially perpendicular to the reference plane N), and there is substantially no displacement in the thickness direction of the bag 17 (the normal direction of the transfer path of the bag 17 clamped by the clamping components 16). Naturally, all of the pairs of the left and right grippers 13 installed on the table 12 assume this new reference layout.

As seen from the above, in the above-described bag transfer device, just as in the bag transfer device of Japanese Utility Model Application Publication No. H5-28169, the spacing between the grippers 13 (the clamping components 16) can be changed according to the bag size (bag width) by raising or lowering the cylindrical cam 20; however, any tilting of the clamping faces of the clamping components 16 of the left and right grippers 13 and any change in the transfer path of the bags (deviation in the thickness direction of the bags) can be substantially prevented.

Meanwhile, when the cylindrical cam 20 reverses its rotation while the table 12 is intermittently rotating, the cam follower 42 of the cam lever 41 is rotated and moves up and down over the cam face of the cylindrical cam 20, and the drive force of the cam is transmitted through the pivot lever 37 and the various links constituting the drive force transmission mechanism 22, and finally from the first links 46 to the seventh links 26 of the arm support mechanisms 21, as described above. The grippers 13 are moved intermittently along the movement path; and in the course of this movement (during the intermittent stops), the arms 15 are moved substantially perpendicular to the reference plane N according to the shape (protrusion) of the cam face of the cylindrical cam 20, and the spacing between the grippers 13 (the spacing between the clamping components 16) changes. In this situation as well, as described above, the clamping faces of the clamping components 16 are maintained in substantially the same plane (a plane substantially perpendicular to the reference plane N), and there is substantially no displacement in the thickness direction of the bag 17 (the normal direction of the transfer path of the bag 17 clamped by the clamping components 16).

As seen from the above, in the bag transfer device of the present invention, even when the left and right spacing is increased or decreased while the grippers are being moved intermittently along the movement path, tilting of the clamping faces of the clamping components of the grippers and changes in the transfer path of the bags can be substantially prevented.

Figure 5:
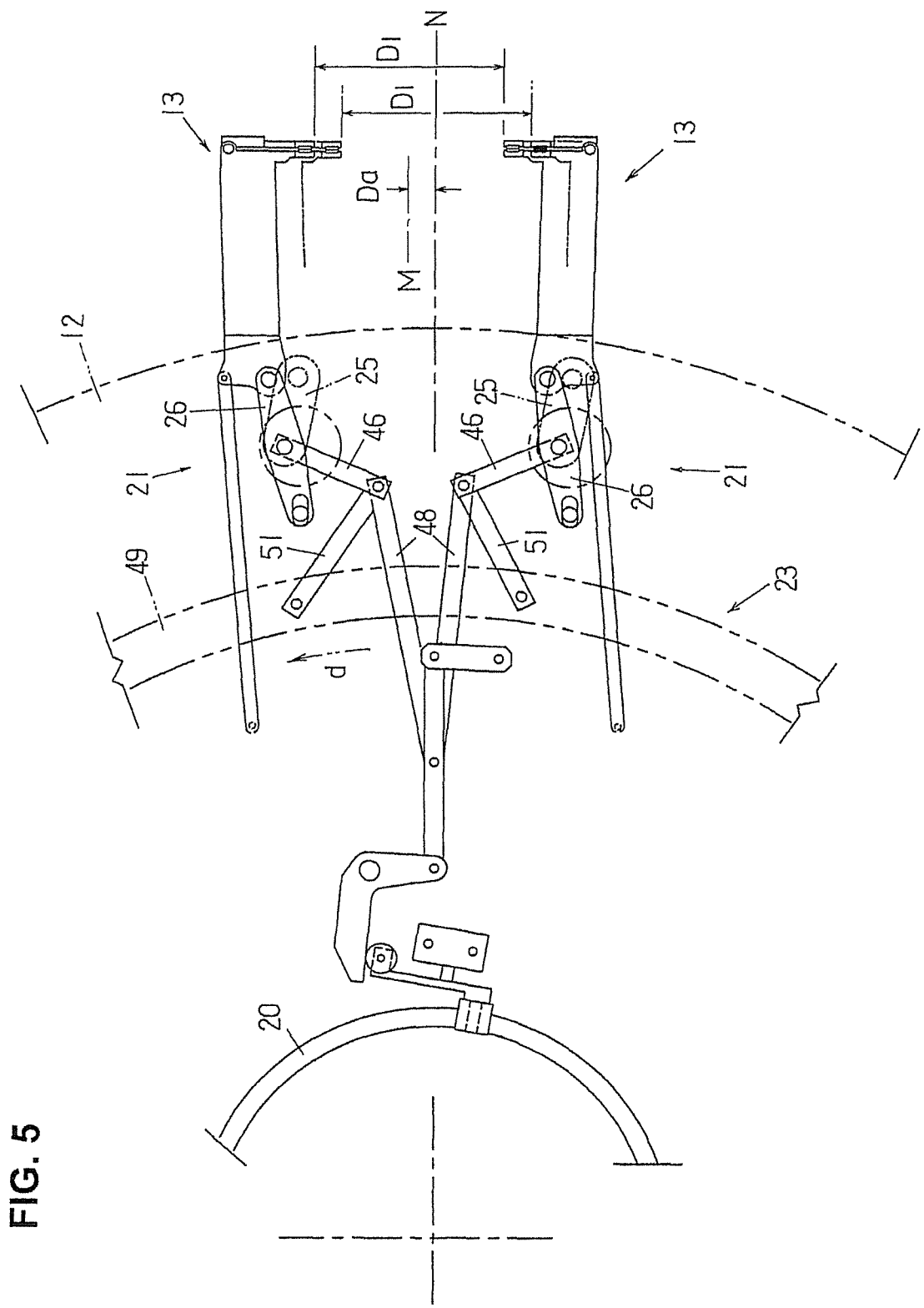
FIG. 5 is a partial top view of the bag transfer device shown in FIGS. 1 to 3 and illustrates the action of a gripper layout adjustment mechanism for left and right grippers.

The action of the gripper layout adjustment mechanism 23 will now be described below with reference to FIG. 5.

When the motor 55 (see FIG. 3) is actuated and the threaded shaft 54 is rotated thereby, the adjusting ring 49 is rotated relative to the table 12 (the rotation direction is indicated by the arrow d), and one end of each one of the pair of (or two) second links 51 is moved together with the adjusting ring 49. Consequently, the pairs of the second links 51, the fifth links 48, and the first links 46 are moved to asymmetrical positions with respect to the reference plane N, resulting in that the seventh links 26 are moved to asymmetrical positions with respect to the reference plane N.

Accordingly, the left and right grippers 13 are displaced substantially in the perpendicular direction with respect to the reference plane N while more or less maintaining the original spacing D1 (displaced from the position of the two-dot chain line to the position of the solid line). The vertical plane (center plane M) that passes through the center of the left and right grippers 13 is also displaced from the reference plane N (by a displacement amount Da). This layout of the left and right grippers 13 is the eccentric layout described above. The displacement amount Da (degree of eccentricity) can be selected as needed from within a specific range.

When the cylindrical cam 20 is raised and lowered, or the table 12 is intermittently rotated (and the cylindrical cam 20 is rotated forward and backward at the same time), the left and right grippers 13 basically maintain the above-described eccentric layout while their spacing is increased or decreased substantially in a symmetric fashion with respect to the center plane M in between. Even though the left and right grippers 13 assume this eccentric layout, when the cylindrical cam 20 is raised or lowered, or while the left and right grippers 13 are moved intermittently along the movement path, the clamping faces of the clamping components 16 are maintained in substantially the same plane (a plane substantially perpendicular to the reference plane N), and there is substantially no displacement in the thickness direction of the bag 17 (the normal direction of the transfer path of the bag 17 clamped by the clamping components 16).

Next, a significance of the left and right grippers 13 that take the above-described eccentric layout will be described with reference to FIGS. 6A through 7C.

Figure 6A:
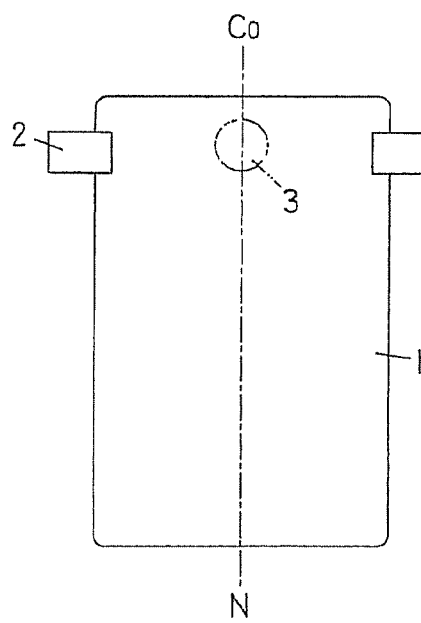
FIGS. 6A through 6C illustrate the significance of left and right grippers having an eccentric layout in transferring bags having spouts by the bag transfer device of the present invention used in a bag filling and packaging apparatus, in which spouts are attached to the upper end corners of bags.
Figure 6B:
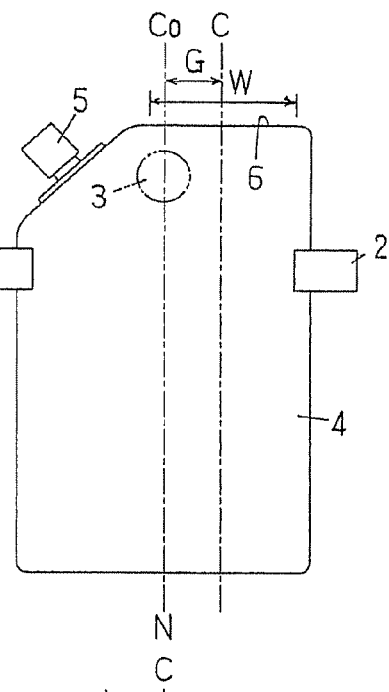
Figure 6C:
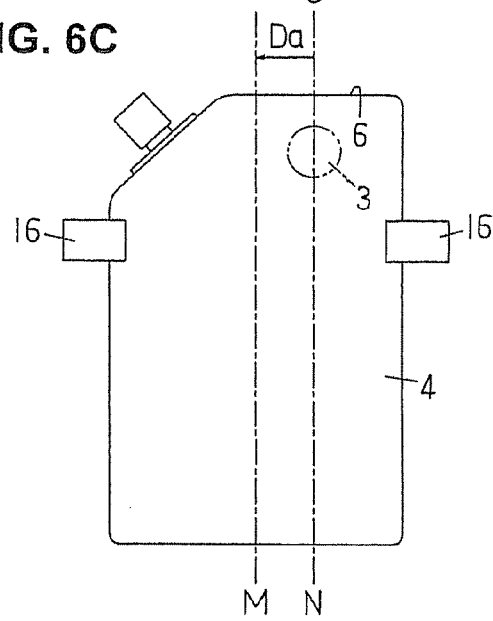

The description will be made for the bag transfer device shown in FIGS. 1 to 3 that is incorporated in a bag filling and packaging apparatus explained with reference to FIGS. 6A and 6B; and in this description, the layout of the left and right grippers is changed from the reference layout shown in FIG. 6B to the eccentric layout shown in FIG. 6C. In this example, a change in the bags is accompanied by the displacement of a vertical plane (center plane M) passing through the center of the grippers (the clamping components 16) from the reference plane N (displacement amount Da=G), the offset G shown in FIG. 6B is eliminated, and the center line C of the open part 6 is positioned on the reference plane N. In FIG. 6C, the clamping components of the grippers are numbered 16 as in the bag transfer device shown in FIGS. 1 to 3.

In this case, the horizontal direction (the width direction of the bags) of the bag opening device, the bag filling device, and any other devices that are used to perform the bag filling steps is set so that the reference plane N is used as the reference, and there is no particular need to adjust anything after a bag change. Only the bag feed device needs to be adjusted, so that the center line C of the open part 6 of the bag 4 supplied to the left and right grippers (the clamping components 16) is located on the reference plane N.

When the left and right grippers (the clamping components 16) are thus set in an eccentric layout, the suction position of the suction cups 3 becomes the center line C of the open part 6 (on the reference plane N), the filling nozzle is raised and lowered along the center line C of the open part 6 (on the reference plane N), and there is no interference (or difficulty) in opening or filling of the bag. The same applies to other subsequent devices.

Figure 7A:
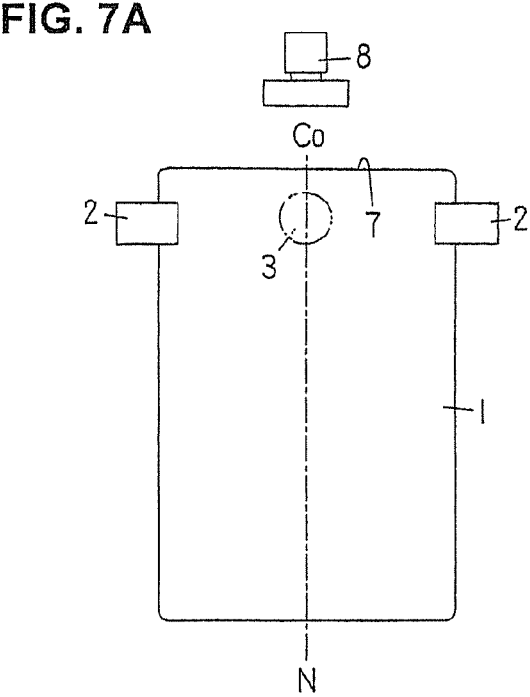
FIGS. 7A through 7C illustrate the significance of left and right grippers having an eccentric layout in transferring bags having spouts by the bag transfer device of the present invention used in a spout attachment device.
Figure 7B:
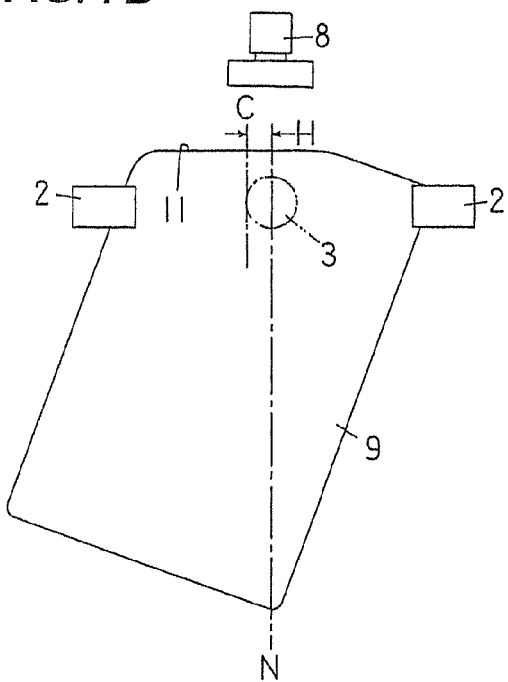
Figure 7C:
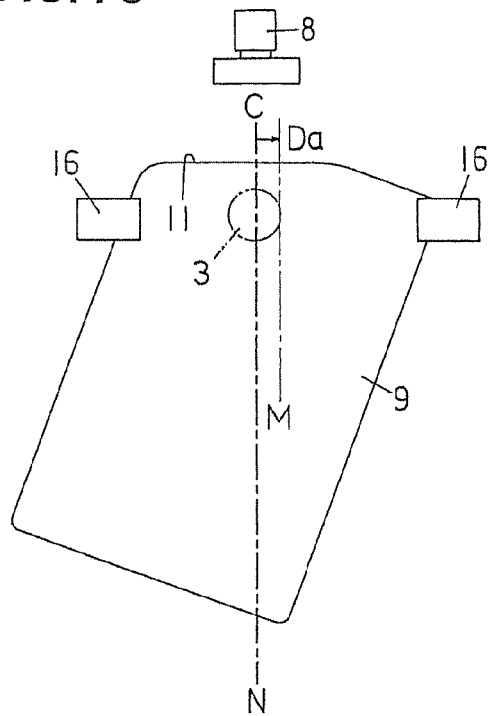

The description will also be made below for the bag transfer device shown in FIGS. 1 to 3 incorporated in the spout attachment device described with reference to FIGS. 7A and 7B; and in this description, the layout of the left and right grippers is changed from the reference layout shown in FIG. 7B to the eccentric layout shown in FIG. 7C. In this example, a change in the bags is accompanied by the displacement of a vertical plane (center plane M) passing through the center of the grippers (the clamping components 16) from the reference plane N (displacement amount Da=H), the offset H shown in FIG. 7B is eliminated, and the center line C of the open part 11 is positioned on the reference plane N. In FIG. 7C, the clamping components of the grippers are numbered 16 as in the bag transfer device shown in FIGS. 1 to 3.

In this case, the opening device, the spout insertion and temporary sealing device, and any other devices used to perform the spout attachment steps are set so that the reference plane N is used as a reference; and in regard to the horizontal direction (the width direction of the bags), there is no particular need to adjust anything after a bag change. Only the bag feed device needs to be adjusted so that the center line C of the open part 11 of the bag 9 supplied to the left and right grippers (the clamping components 16) will be located on the reference plane N.

When the left and right grippers (the clamping components 16) are thus set in an eccentric layout, the suction position of the suction cups 3 becomes the center line C of the open part 11 (on the reference plane N), the insertion position of the spout 8 lies on the center line C of the open part 11 (on the reference plane N), and there is no interference (difficulty) in opening of the bag or spout insertion and temporary sealing of the bag. The same applies to other subsequent devices.

Alternative mechanisms for the first restricting mechanism 27 and the second restricting mechanism 28 will be described below.

The first restricting mechanism 27 serves to restrict the movement direction of the other end of the seventh links 26 of the arm support mechanisms 21 so that the other end is will be parallel to the reference plane N (substantially perpendicular to the width direction of the bag 16 clamped by the clamping components 16); and in the structure above shown in FIGS. 1 to 3, the first restricting mechanism 27 is comprised of the sliding members 32, installed at the other end of the seventh links 26, and slots 33, formed in the table 12.

Figure 8:
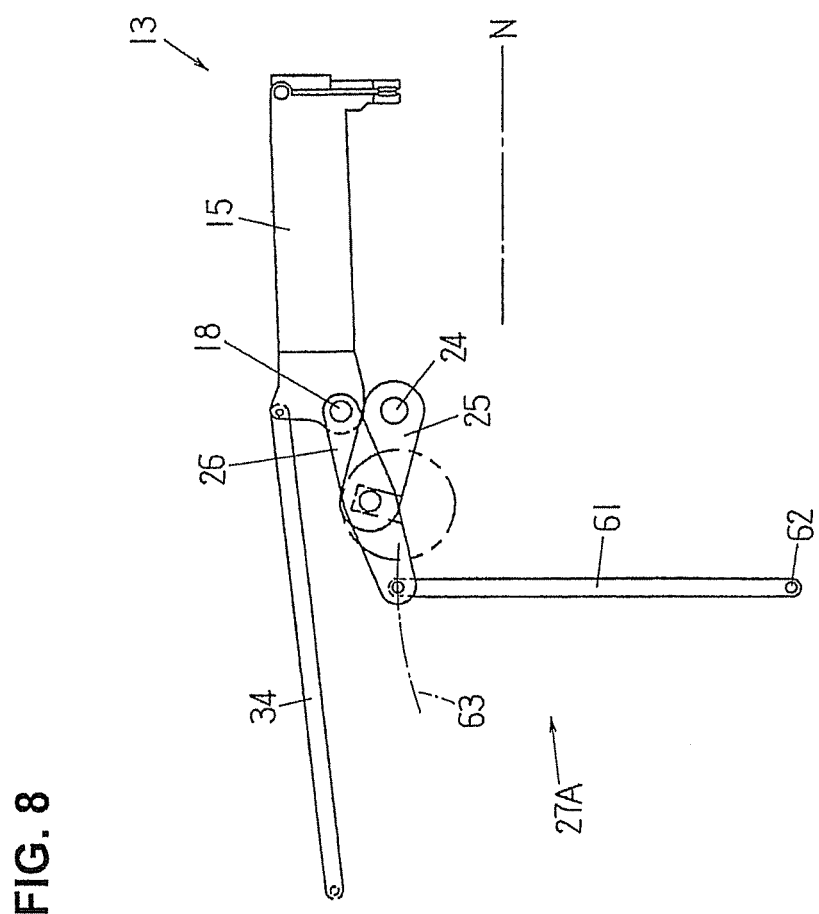
FIG. 8 is top view of main components of a first restricting mechanism of another example.

One example of the alternative first mechanism will be described with reference to FIG. 8. This alternative first restricting mechanism 27A is comprised of a restricting link 61 that is linked at one end thereof to the table 12 so as to be able to pivot in a horizontal plane. The restricting link 61 extends substantially perpendicular to the reference plane N; and it is linked at one end thereof to a support shaft 62 installed on the table 12, is pivotable in a horizontal plane, and is linked at another end thereof to the other end of the seventh link 26. The other end of the seventh link 26 is movable substantially parallel to the reference plane N (along a movement path 63), and the sixth links 25, the seventh links 26, and the first restricting mechanism 27A approximate a Scott-Russell mechanism; and when the other end of the seventh link 26 is moved along the movement path 63, the one end (the first support shaft 8) of the seventh link 26 is moved substantially perpendicular to the reference plane N.

The second restricting mechanism 28 serves to restrict the movement direction of the second support shaft 9 so that the movement direction it is substantially perpendicular to the reference plane N; and in the structure above shown in FIGS. 1 to 3, it comprises the restricting link 35 that is linked to the table 12 so as to be pivotable in a horizontal plane.

Figure 9:
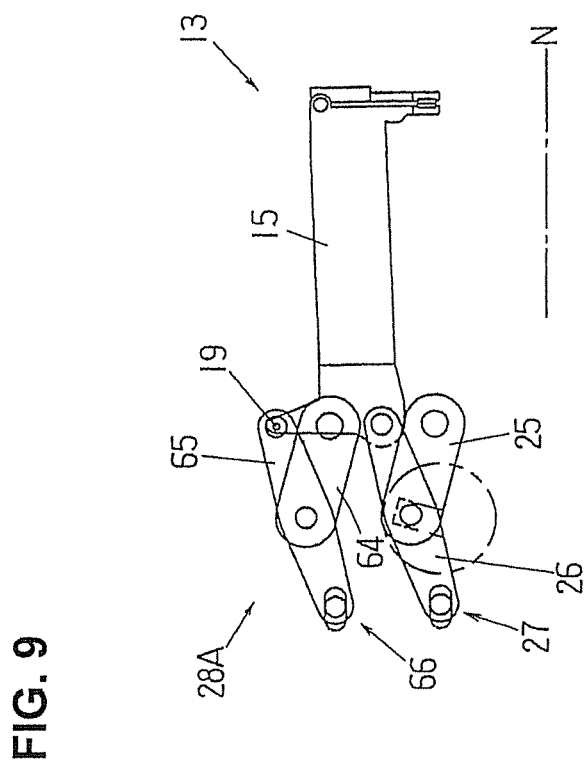
FIG. 9 is top view of main components of a second restricting mechanism of another example.

One example of an alternative second mechanism will be described through reference to FIG. 9; and this alternative second restricting mechanism 28A is the same as the Scott-Russell mechanism (that is formed by the sixth link 25, the seventh link 26, and the first restricting mechanism 27) that restricts the movement direction of the first support shaft 18; and this alternative second mechanism is comprised of a link 64 (same as the sixth links 25) that is pivotable in a horizontal plane, a link 65 (same as the seventh links 26) that is linked at one end thereof to the second support shaft 19 and is linked in the center to the other end of the link 64, and a restricting mechanism 66 (same as the first restricting mechanism 27) that restricts the movement direction of the other end of the link 65. Accordingly, when the one (the first support shaft 18) end of the seventh links 26 is moved perpendicular to the reference plane N, one (the second support shaft 19) end of the link 65 is also moved perpendicular to the reference plane N.

Figure 10:
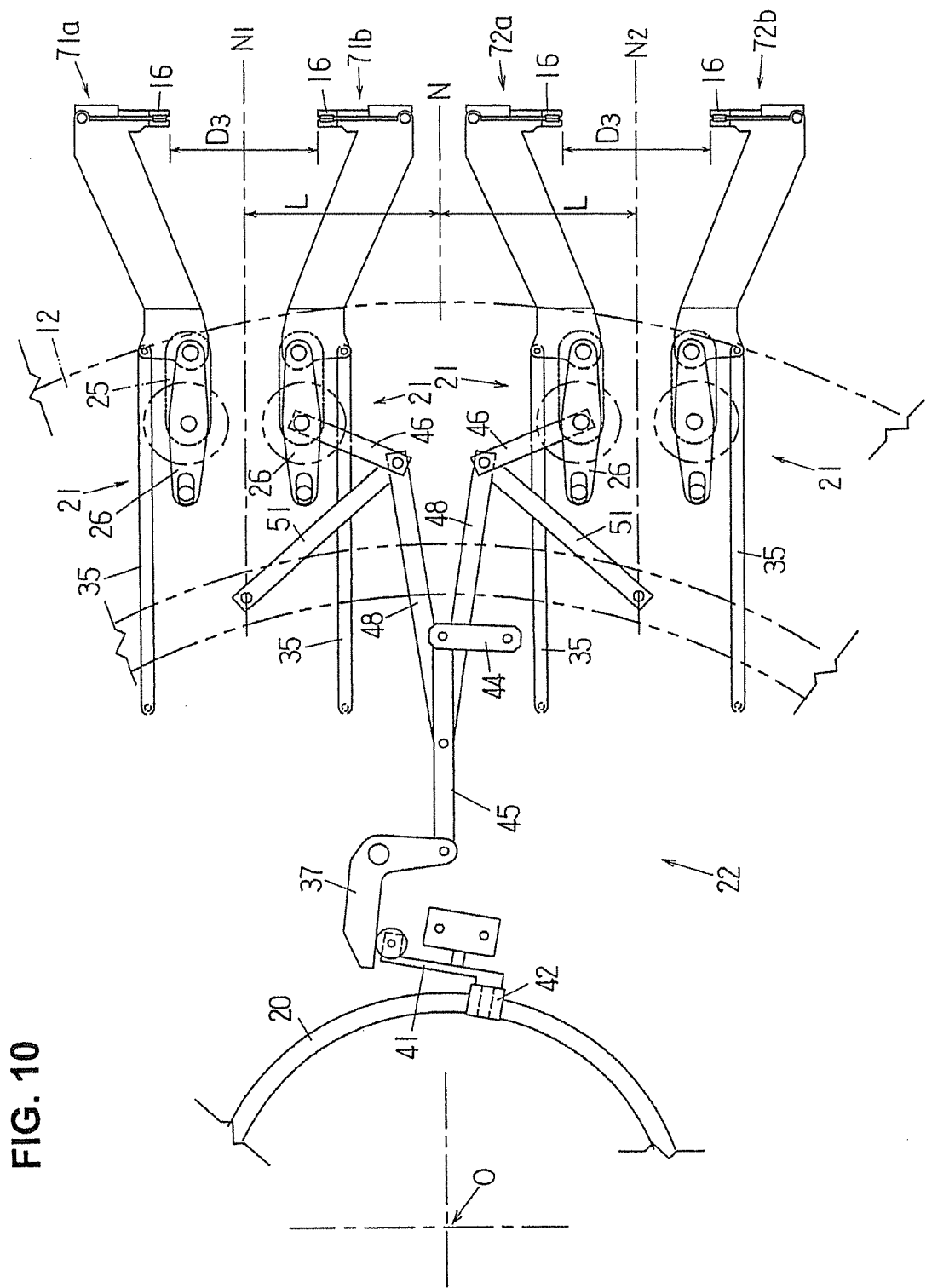
FIG. 10 is a partial top view of a double bag transfer device according to the present invention, in which members disposed below the table are drawn by solid lines.
Figure 11:
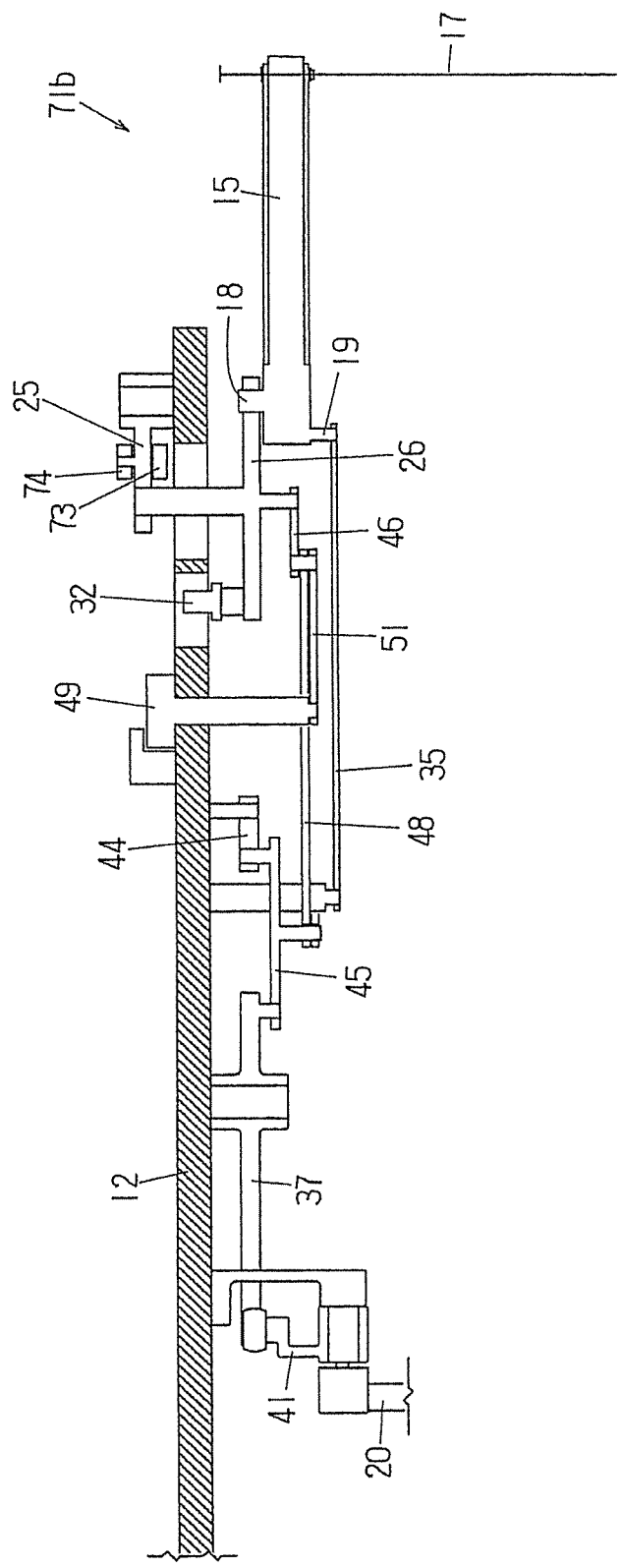
FIG. 11 is a partially cross-sectional partial side view of the bag transfer device shown in FIG. 10.
Figure 12:
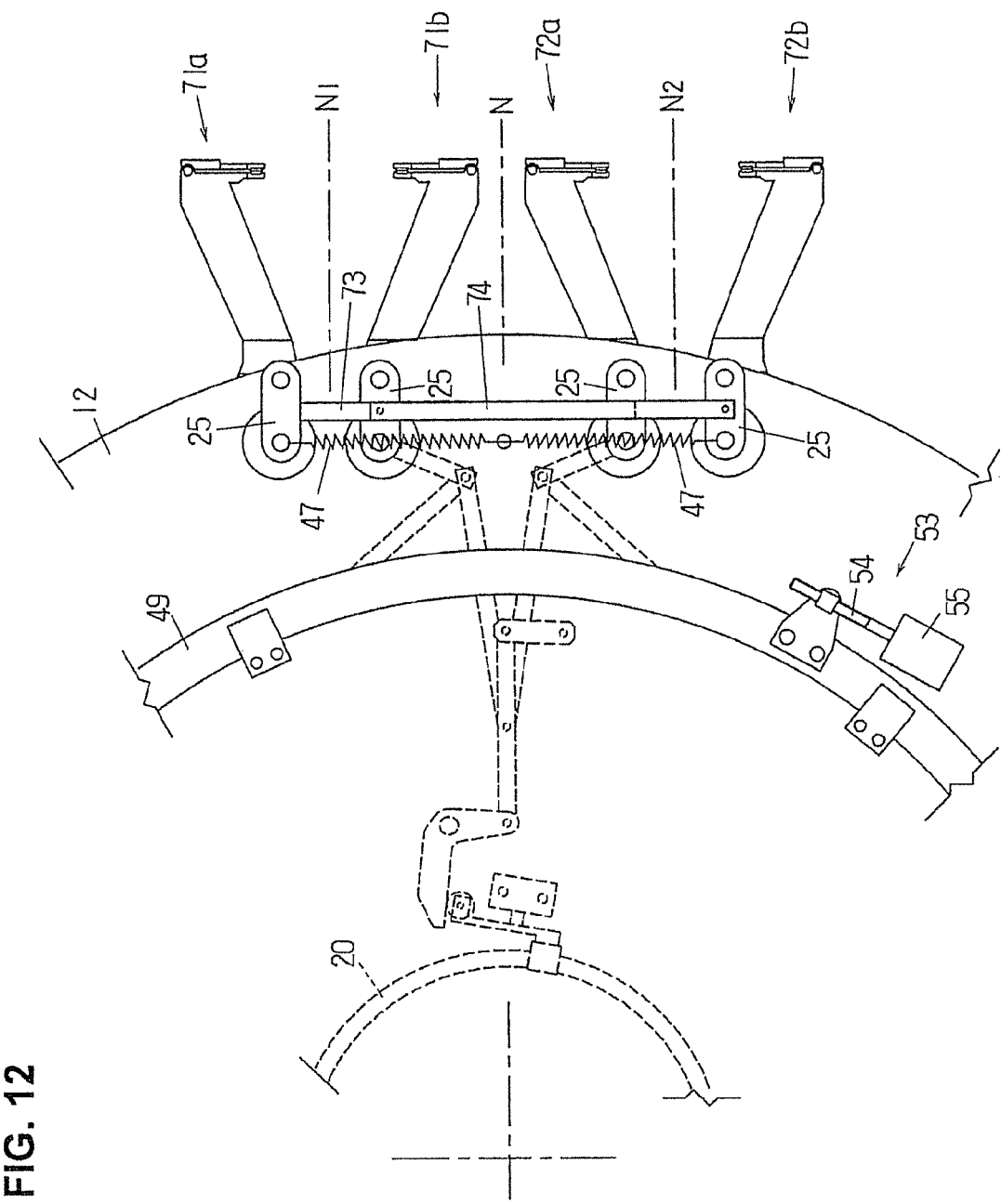
FIG. 12 is a partial top view of the bag transfer device shown in FIGS. 10 and 11, in which members disposed above the table are mainly illustrated.

FIGS. 10 to 12 show a double bag transfer device. In FIGS. 10 to 12, components that are substantially the same as those in the single bag transfer device shown in FIGS. 1 to 3 will be numbered the same when appropriate. A double bag transfer device is applied to, for example, a double rotary bag filling and packaging apparatus (disclosed in Japanese Patent Application Laid-Open (Kokai) 2004-244085). The double bag transfer device shown in FIGS. 10 to 12 will now be described below, focusing on the portion that differs from the single bag transfer device of FIGS. 1 to 3.

In a double bag transfer device, an even number of pairs of left and right grippers are installed around the round table 12 that rotates intermittently and at a constant angle each time in a horizontal plane. As the table 12 rotates intermittently, the left and right gripper pairs are moved along a circular movement path, and (for instance, two) bags clamped by (for instance, two pairs of) left and right grippers are transferred simultaneously along the circular transfer path.

In FIG. 10, two adjacent pairs of left and right grippers (one pair of grippers 71a and 71b and another pair of grippers 72a and 72b) are disposed symmetrically with respect to a vertical plane N (a vertical plane that passes through the axis O of the table 12) that is perpendicular to a tangent to the movement path or the transfer path. The pair of grippers 71a and 71b is disposed symmetrically with respect to a vertical plane N1 that is parallel to the vertical plane N and is a specific distance (distance L) away from the reference plane N on the downstream side of the movement path. The other pair of grippers 72a and 72b is disposed symmetrically with respect to a vertical plane N2 that is parallel to the vertical plane N and is a specific distance (distance L) away from the reference plane N on the upstream side of the movement path.

As the grippers 71a and 71b are moved along the movement path, the spacing between them increases or decreases symmetrically with respect to the vertical plane N1; and as the grippers 72a and 72b are moved along the movement path, the spacing between them increases or decreases symmetrically with respect to the vertical plane N2. This layout of the two adjacent pairs of left and right grippers 71a and 71b and also 72a and 72b in the double bag transfer device is called a reference layout in the present invention, and the vertical planes N, N1, and N2 are called reference planes (hereinafter referred to as the reference plane N, the reference plane N1, and the reference plane N2). It should go without saying that all of the pairs of left and right grippers installed on the table 12 assume this reference layout along with the adjacent pairs of left and right grippers.

In this double bag transfer device, one arm support mechanism 21 is installed for each of the two pairs of left and right grippers 71a and 71b and also 72a and 72b, and a single drive force transmission mechanism 22 common to or shared by these two pairs is provided. The other ends of the first links 46 of the drive force transmission mechanism 22 are linked respectively to the centers of the seventh links 26 of the gripper 71b and the gripper 72a.

As seen from FIGS. 11 and 12, of the grippers 71a and 71b, the gripper 71a, which is on the downstream side (of the rotating table), has an arm support mechanism 21 that is linked to a first connecting link 73; and of the grippers 72a and 72b, the gripper 72a, which is on the downstream side (of the rotating table), has an arm support mechanism 21 that is linked to the first connecting link 73. Furthermore, of the grippers 71a and 71b, the arm support mechanism 21 of the gripper 71b, which is on the upstream side, is linked to a second connecting link 74; and of the grippers 72a and 72b, the arm support mechanism 21 of the gripper 72b, which is on the upstream side, is linked to the second connecting link 74.

More specifically, the first connecting links 73 are linked to the sixth links 25 that are part of the arm support mechanisms 21 of the grippers 71a and 72a, while the second connecting links 74 are linked to the sixth links 25 that are part of the arm support mechanisms 21 of the grippers 71b and 72b. Accordingly, movement of the arm support mechanism 21 of the gripper 71b is transmitted directly to the arm support mechanism 21 of the gripper 72b; and movement of the arm support mechanism 21 of the gripper 72a is transmitted directly to the arm support mechanism 21 of the gripper 71a. As a result, the movement of the gripper 71a is the same as that of gripper 72a and the two are synchronized; and the movement of the gripper 71b is the same as that of the gripper 72b and the two are synchronized.

Each one of two biasing members (tension springs 47) is provided as part of the drive force transmission mechanism 22, and it is connected at one end thereof to the table 12 and at another end thereof to the sixth link 25 of the grippers 71a and 72b.

In FIG. 10, the spacing between the grippers 71a and 71b and the spacing between the grippers 72a and 72b (the spacing of the clamping components 16) is D3 for both. The clamping faces of the clamping components 16 of the grippers 71a and 71b and those of the grippers 72a and 72b lie in a vertical plane that is perpendicular to the reference plane N and also lie in substantially the same plane. Similarly, the width direction of the bag clamped by the left and right clamping components 16 is always perpendicular to the reference plane N.

When the cylindrical cam 20 is moved up or down, just as with the single bag transfer device shown in FIGS. 1 to 3, the cam follower 42 of the cam lever 41 moves up or down, and drive force caused thereby is transmitted, through the various links and the pivot levers 37 constituting the drive force transmission mechanism 22, to the seventh links 26 of the arm support mechanisms 21 of the grippers 71b and 72a. As a result, the grippers 71b and 72a are moved symmetrically to each other and substantially perpendicular to the reference plane N; and at the same time, the grippers 71a and 72b are moved symmetrically to each other and substantially perpendicular to the reference plane N. The movement of the pair of grippers 71a and 71b is symmetrical on either side of the reference plane N1, and the movement of the pair of grippers 72a and 72b is symmetrical on either side of the reference plane N2.

Figure 13:
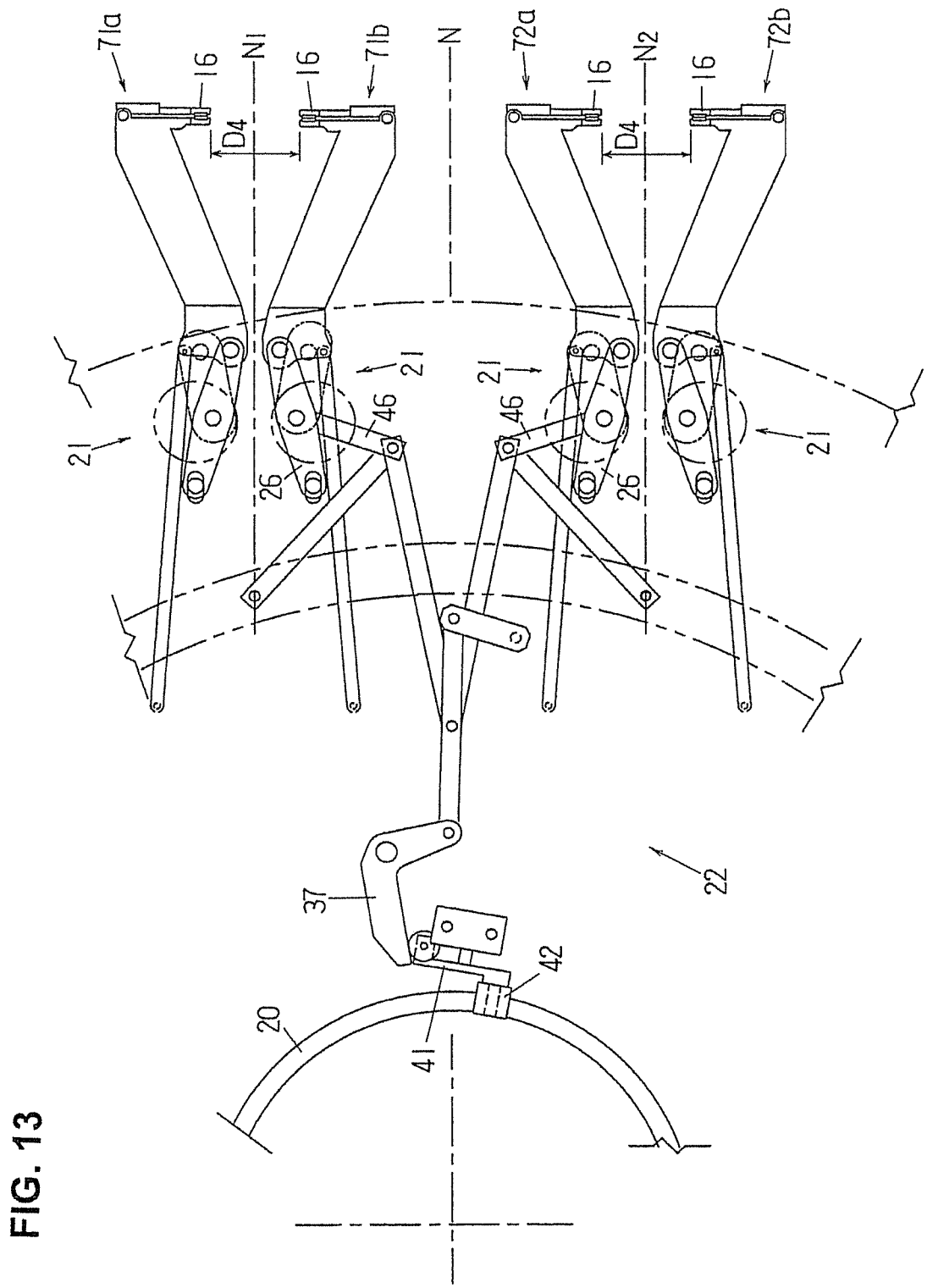
FIG. 13 is a partial top view of the bag transfer device shown in FIGS. 10 to 12 and illustrates the action of a spacing adjustment mechanism for left and right grippers.

FIG. 13 shows the positions of the various links and levers when the cylindrical cam 20 is lowered a specific distance, and it also shows the positions of the grippers 71a and 71b and the grippers 72a and 72b. The grippers 71a and 71b are moved in substantially symmetrical fashion with the perpendicular plane N1 in between them, and grippers 72a and 72b are moved in substantially symmetric fashion with the perpendicular plane N2 in between them. The spacing between the grippers 71a and 71b (clamping components 16) and the grippers 72a and 72b (clamping components 16) narrows from D3 (see FIGS. 10) to D4. Even though the spacing between the grippers 71a and 71b and the grippers 72a and 72b changes, the clamping faces of the clamping components 16 are maintained in substantially the same plane (a plane that is substantially perpendicular to the reference plane N), and there is substantially no displacement in the bag thickness direction (the normal direction of the transfer path of the bags clamped in the clamping components 16).

As seen from the above, in the double bag transfer device of the present invention, the spacing of the left and right clamping components of the grippers 71a and 71b and the grippers 72a and 72b can be varied according to the bag size (bag width) by raising or lowering the cylindrical cam 20; and in such varying in bag size, tilting of the clamping faces of the clamping components 16 of the grippers 71a and 71b and of the grippers 72a and 72b and a change in the transfer path of the bags can be substantially prevented.

Although not described in detail, the same applies when the table 12 rotates intermittently (with the cylindrical cam 20 rotating forward and backward at the same time), and the cam follower 42 of the cam lever 41 is moved up and down by rotating over the cam face of the cylindrical cam 20.

Figure 14:
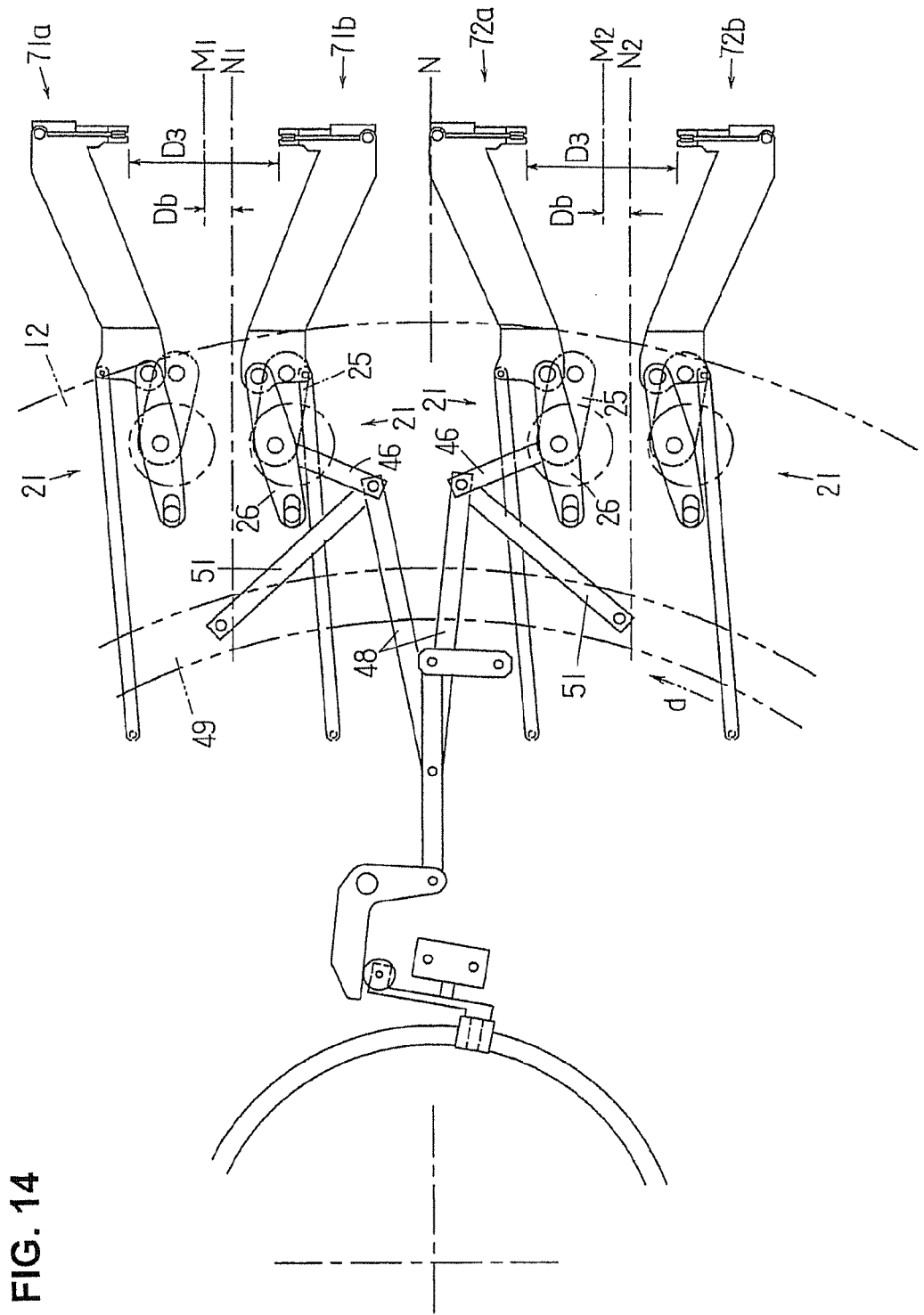
FIG. 14 is a partial top view of the bag transfer device shown in FIGS. 10 to 12 and illustrates the action of a gripper layout adjustment mechanism for left and right grippers.

The action of the gripper layout adjustment mechanism 23 will now be described through reference to FIG. 14.

When the motor 55 (see FIG. 12) is actuated and the threaded shaft 54 is rotated, the adjusting ring 49 is rotated relative to the table 12 (the rotation direction is indicated by the arrow d), and one end of each of the second links 51 is moved together with the adjusting ring 49. Consequently, the second links 51, the fifth links 48, and the first links 46 are moved to asymmetrical positions with respect to the reference plane N, and this is accompanied by movement of the seventh links 26 of the arm support mechanisms 21 of the grippers 71b and 72a to asymmetrical positions with respect to the reference plane N. At the same time, the seventh links 26 of the arm support mechanisms 21 of the grippers 71a and 72b are also moved in the same direction.

As a result, the grippers 71a and 71b and the grippers 72 and 72b are displaced (displacement amount Db) in a direction that is substantially perpendicular to the reference plane N while the original spacing D3 is more or less maintained. The vertical planes (center planes M1 and M2) that pass through the center of the grippers 71a and 71b and the grippers 72 and 72b, respectively, after displacement are offset by the displacement amount Db with respect to the reference planes N1 and N2. This layout of the grippers 71a and 71b and of the grippers 72a and 72b is called an eccentric layout in the present invention. The displacement amount Db can be selected as desired from within a specific range. It should go without saying that all of the pairs of left and right grippers installed on the table 12 assume this new eccentric layout along with the pair of adjacent left and right grippers.

When the cylindrical cam 20 is raised or lowered, or when the table 12 rotates intermittently, the two sets of grippers 71a and 71b and also 72a and 72b basically keep this eccentric layout while their spacing is increased or decreased substantially in a symmetric fashion with the center planes M1 and M2 in between. Even when the two sets of grippers 71a and 71b and grippers 72a and 72b assume an eccentric layout, as long as these grippers are moved along the movement path, the clamping faces of the clamping components 16 are maintained in substantially the same plane (a plane that is substantially perpendicular to the reference plane N), and substantially no displacement occurs for the clamping surfaces in the bag thickness direction (the normal direction of the transfer path of the bags clamped by the clamping components 16).

In the bag transfer device described above, both of the second links 51 in each pair are linked to the adjusting ring 49. Therefore, when the adjusting ring 49 is rotated, in a single bag transfer device (FIGS. 1 to 3) both of the arm support mechanisms 21 of the pair of grippers 13 are actuated in the same direction, and the grippers 13 are both displaced in the same direction. On the other hand, when the adjusting ring 49 is rotated, in a double bag transfer device (FIGS. 10 to 12), the grippers 71a and 71b and the grippers 72a and 72b are both displaced in the same direction.

On the other hand, only one of the pair of (or one of the two) second links 51 can be linked to the adjusting ring 49 with the being linked to the table 12. In this structure, when the adjusting ring 49 is rotated, in a single bag transfer device (FIGS. 1 to 3) just the arm support mechanism 21 of one of the grippers 13 in the pair is actuated, so that only the other gripper 13 is displaced. The same applies to a double bag transfer device (FIGS. 10 to 12); and by linking either one of the two second links 51 to the adjusting ring 49, only the grippers 71b and 72b or only the grippers 71a and 72 are displaced.

An apparatus for manufacturing a corner spouted bag will be described below with reference to FIGS. 15 and 16. The description will be made for a bag transfer device of the present invention (the bag transfer device shown in FIGS. 10 to 12) incorporated in a spout attachment device of a corner spouted bag manufacturing apparatus.

Figure 15:
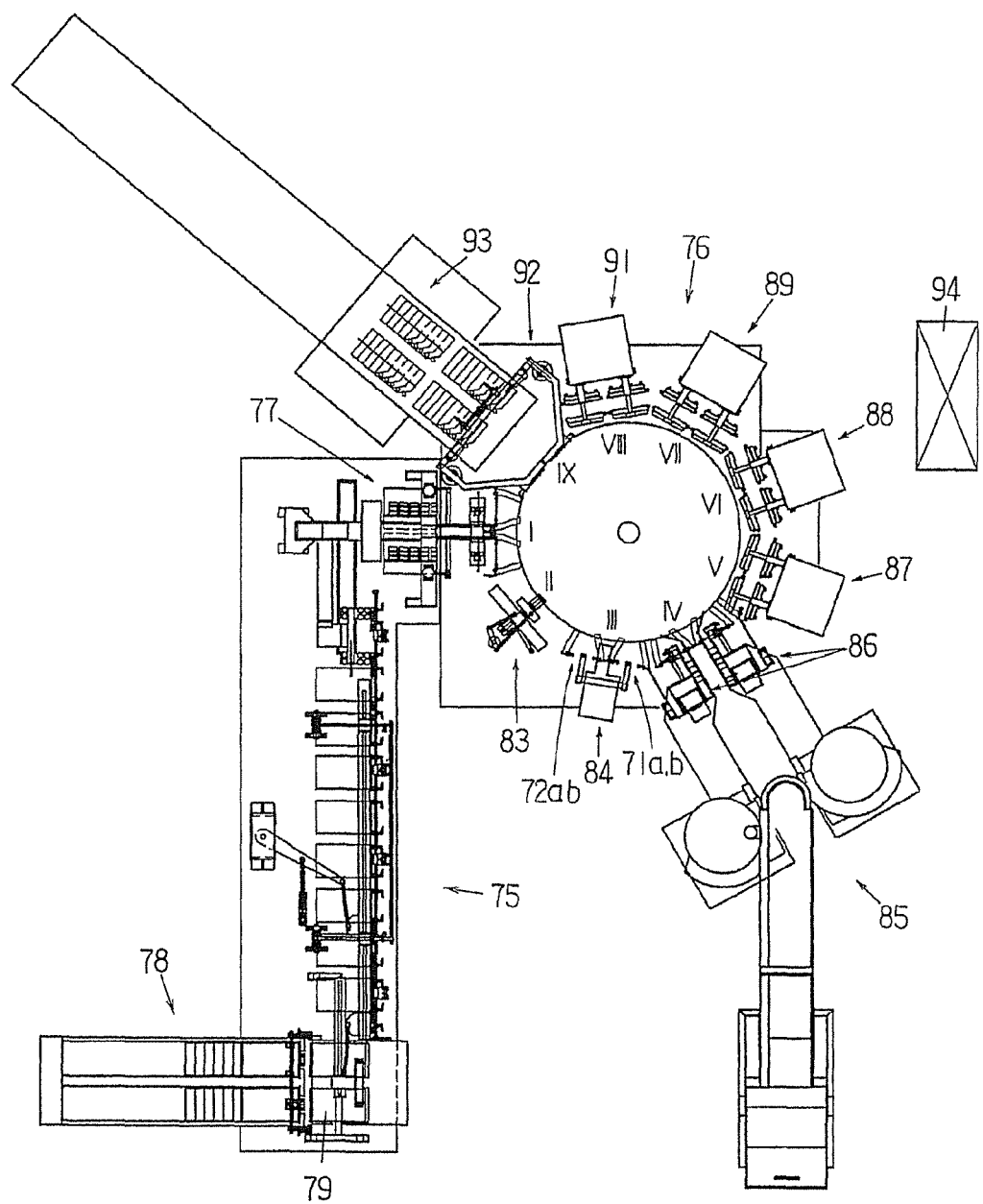
FIG. 15 is a top view of an apparatus for manufacturing corner spouted bags.

The corner spouted bag manufacturing apparatus shown in FIG. 15 includes a gas injection and sealing device 75, a spout attachment device 76, and a bag feed device 77 that is installed between these two devices.

Figure 16A:
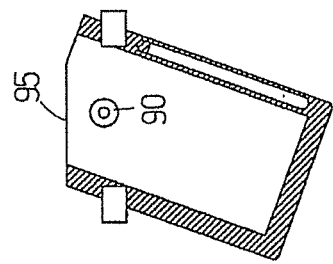
FIG. 16A through 16F illustrate spout attachment process in the order of the steps taken.

In the gas injection and sealing device 75, a bag 79 supplied from a conveyor magazine type bag feed device 78 is intermittently conveyed in the bag width direction in a horizontal plane; and in the course of this conveyance, a gas is injected through an injection opening formed in the bag 79 into the interior of an airbag of the bag, and then the injection opening is sealed to trap the pressurized gas inside this airbag. As shown in FIG. 16A, the bag 79 is square in top view and is sealed on three sides, an airbag 81 is formed in the up and down (or depth) direction on one side edge of the bag 79, and the injection opening is formed at the upper end thereof A bag such as the bag 79 that is equipped with an airbag is disclosed in, for example, Japanese Patent Application Laid-Open (Kokai) Nos. 2009-12800 and 2007-118961. The air injection method and device, the sealing method and device, and so forth disclosed in these patent references are also vertical types (in which the left and right edges of a bag are clamped by left and right grippers and the bag is intermittently conveyed while hanging down vertically, while a gas is blown into its airbag); and these can also be applied to the gas injection and sealing device 75 by converting them to a horizontal type (in which a bag is intermittently conveyed within a horizontal plane while a gas is being blown into the airbag).

After the gas has been injected into the airbags 81 of the bags 79 by the gas injection and sealing device 75, the bags 79 are sent to the bag feed device 77 while still in a horizontal state. Then, the bags are supplied simultaneously one at a time (a total of two) to two pairs of left and right grippers (grippers 71a and 71b and grippers 72a and 72b) of the spout attachment device 76. More specifically, the bag feed device 77 uses suction cups 82 to chuck the upper face of the bag 79 sent from the gas injection and sealing device 75, the bag 79 is switched from a horizontal state (in which the bag surface lies in a horizontal plane) to a vertical state (in which the bag surface lies in a vertical plane), and at the same time, the bag 79 is rotated by a specific angle (the angle θ1) along the bag surface during this bag supply process.

Therefore, as shown in FIG. 16A, the bag 79 is supplied from the bag feed device 77 to the grippers 71a and 71b (the clamping components 16) of the spout attachment device 76 in a state of being tilted by a specific angle (the angle θ1) with respect to the vertical direction. The horizontal position of the bag 79 supplied from the bag feed device 77 to the grippers 71a and 71b (the clamping components 16) is adjusted so that the clamping margin of the clamping components 16 is more or less equal on the left and right. Meanwhile, the layout of the grippers 71a and 71b (the clamping components 16) is the above-described eccentric layout, and thus the vertical plane (center plane M1) that passes through the center of the grippers 71a and 71b (the clamping components 16) is offset by the displacement amount Db with respect to the reference plane N (see FIG. 14). Although not illustrated in FIGS. 16A through 16F, another bag 79 is supplied in the same state to another pair of left and right grippers 72a and 72b in which the layout of the grippers 72a and 72b is also the eccentric layout.

In the bag transfer device of the spout attachment device 76, the two pairs of grippers 71a and 71b and grippers 72a and 72b are rotated intermittently at a constant angle each time along a specific movement path, stopping nine times during one rotation, and various spout attachment steps are carried out on the bag 79, which is clamped by grippers, by the various devices disposed at the various stop positions.

If the first stop position (stop position I) is the stop position to which the bag 79 is supplied, a corner cutting device 83 is disposed near the second stop position (stop position II), and a bag opening device 84 is disposed near the third stop position (stop position III). A part feeder 85 and a spout insertion and temporary filling device 86 are disposed near the fourth stop position (stop position IV), a first sealing device 87 is disposed near the fifth stop position (stop position V), a second sealing device 88 is disposed near the sixth stop position (stop position VI), and a third sealing device 89 is disposed near the seventh stop position (stop position VII). Also, a cooling device 91 is disposed near the eighth stop position (stop position VIII), and a bag discharge device 92 and a conveyor 93 are disposed near the ninth stop position (stop position IX). The reference number 94 refers to a control device that controls all of the gas injection and sealing device 75, the spout attachment device 76, and the bag feed device 77.

The spout attachment step performed by the spout attachment device 76 will be described below with reference to FIGS. 16A through 16F.

Figure 16B:
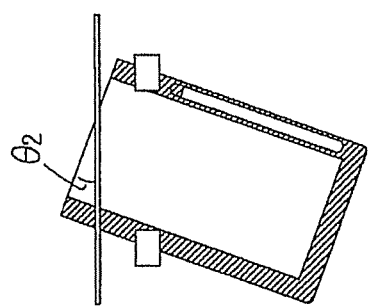

When the grippers 71a and 71b that clamp the bag 79 stop at the stop position II, the corner cutting device 83 is actuated; and as shown in FIG. 16B, the corner part of the bag 79 is cut off to form a horizontal corner opening 95. The corner opening 95 is inclined by an angle θ2 with respect to the width direction of the bag 79. The angle θ1 discussed above is set on the basis of the inclination angle θ2 of the corner opening 95 that is to be formed in the bag 79 (θ1=θ2).

Figure 16C:
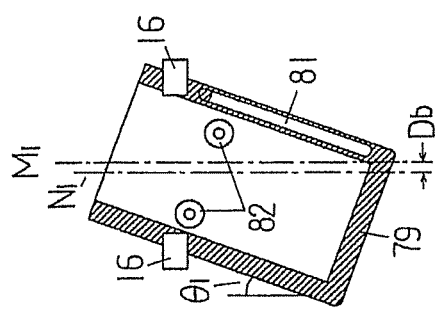

At the stop position III, the opening device 84 is actuated; and as shown in FIG. 16C, a pair of suction cups 90 are moved forward and adhere to the sides of the bag 79 and then moved back to open the corner opening 95.

Figure 16D:
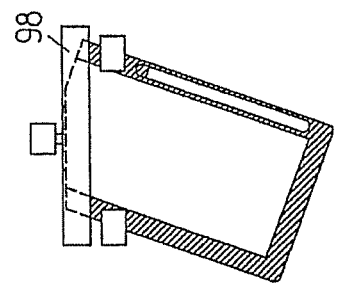

At the stop position IV, the spout insertion and temporary filling device 86 is actuated; and as shown in FIG. 16D, a spout 96 is inserted into the center of the corner opening 95 of the bag, and then the spout 96 is temporarily sealed to both sides of the bag 79.

Figure 16E:
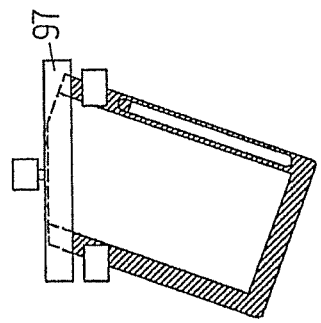

At the stop positions V to VII, the various sealing devices 87 to 89 are actuated; and as shown in FIG. 16E, the spout 96 is sealed to both sides of the bag 79, and at the same time the two sides of the bag 79 are sealed together. The reference number 97 in FIG. 16E is a hot plate used for such sealings.

Figure 16F:
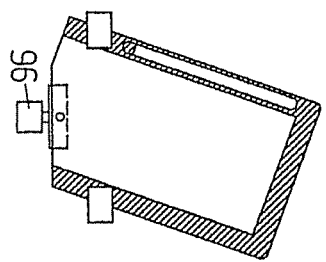

At the stop position VIII, the cooling device 91 is actuated, and the sealed portions of the bag are cooled as shown in FIG. 16F. The reference number 98 in FIG. 16F is a cooling plate used for such steps.

At the stop position IX, the bag discharge device 92 is actuated, two bags 79 (corner spouted bags) are received from the two pairs of left and right grippers (grippers 71a and 71b and gripper 72a and 72b), and these bags are arranged in two rows on the conveyor 93. On the conveyor 93, as shown in FIG. 15, numerous bags are accumulated (to form a bag group 79A) in a state in which the next bag goes under the preceding bag (see FIG. 7 of Japanese Patent Application Laid-Open (Kokai) No. H8-337217), with the bags offset in the bag width direction by about one-third of the bag width. The conveyor 93 is a conveyor of a conveyor magazine type bag feed device that supplies corner spouted bags 79 (bag group 79A) to a filling device (not shown), and the accumulated bag group 79A is supplied directly to the filling device.

The invention claimed is:

1. A bag transfer device, which comprises:
    a table that intermittently rotates by a constant angle around a vertical axis thereof within a horizontal plane,
    a plurality of pairs of grippers that are disposed around the table and moved along a circular movement path as the table rotates, and
    a spacing adjustment mechanism that increases or decreases a spacing within the horizontal plane of the pair of grippers while the plurality of pairs of grippers are being moved along the movement path; and
    in which
        each gripper is composed of an arm and a clamping component installed at a distal end of the arm,
        the clamping components of the grippers clamp side portions of a bag, and
        the bag is transferred along a circular transfer path; wherein
    the spacing adjustment mechanism comprises:
        an arm support mechanism disposed at each arm of the grippers,
        a drive force transmission mechanism that operates the arm support mechanism, and
        a gripper layout adjustment mechanism that adjusts layout of the grippers using a vertical plane passing through said axis as a reference plane; and
    an operation of the gripper layout adjustment mechanism allows desired setting of:
        a reference layout in which the pair of grippers are laid out opposite each other and spaced apart equally with the reference plane in between, or
        an eccentric layout in which the grippers are laid out opposite each other at mutually different spacings with the reference plane in between.

2. The bag transfer device according to claim 1, wherein when the gripper layout adjustment mechanism operates, the arm support mechanism of each one of the grippers operates in a same direction.

3. The bag transfer device according to claim 1, wherein the gripper layout adjustment mechanism comprises:
    an adjustment ring that is installed on the table and is rotated intermittently along with the table and that is capable of rotating relative to the table around the axis of the table, and
    a ring drive mechanism that rotates the adjustment ring;
    a pair of first links is provided so that one end of each one of the first link is, as part of the drive force transmission mechanism, linked to the arm support mechanism of each one of the grippers;
    a pair of second links is provided so that one end of each one of the second links is linked to another end of each one of the first links, with another end of one of the second links being linked to the adjustment ring and another end of another one of the second links being linked to the table; and
    when the ring drive mechanism is operated, the adjustment ring is rotated, and drive force caused thereby is transmitted through said one of the second links and the first link linked thereto to one of the arm support mechanisms, so that the arm support mechanism is operated to adjust the layout of the grippers.

4. The bag transfer device according to claim 1, wherein the gripper layout adjustment mechanism comprises:
    an adjustment ring that is installed on the table and is rotated intermittently along with the table and that is capable of rotating relative to the table around the axis of the table, and
    a ring drive mechanism that rotates the adjustment ring;
    a pair of first links is provided so that one end of each one of the first link is, as part of the drive force transmission mechanism, linked to the arm support mechanism of each one of the grippers;
    a pair of second links is provided so that one end of each one of the second links is linked to another end of each one of the first links, with another end of each one of the second links being linked to the adjustment ring; and
    when the ring drive mechanism is operated, the adjustment ring is rotated, and drive force caused thereby is transmitted through the second links and the first links to each one of the arm support mechanisms, so that each one of the arm support mechanisms is operated to adjust the layout of the grippers.

5. The bag transfer device according to claim 2, wherein the gripper layout adjustment mechanism comprises:
    an adjustment ring that is installed on the table and is rotated intermittently along with the table and that is capable of rotating relative to the table around the axis of the table, and
    a ring drive mechanism that rotates the adjustment ring;
    a pair of first links is provided so that one end of each one of the first link is, as part of the drive force transmission mechanism, linked to the arm support mechanism of each one of the grippers;
    a pair of second links is provided so that one end of each one of the second links is linked to another end of each one of the first links, with another end of each one of the second links being linked to the adjustment ring; and
    when the ring drive mechanism is operated, the adjustment ring is rotated, and drive force caused thereby is transmitted through the second links and the first links to each one of the arm support mechanisms, so that each one of the arm support mechanisms is operated to adjust the layout of the grippers.

6. The bag transfer device according to any one of claims 3 to 5, wherein
    the spacing adjustment mechanism includes a cylindrical cam that is installed under the table and is capable of moving up and down, and whose center coincides with the axis of the table; and
    the drive force transmission mechanism is comprised of:
        a pivot lever that is linked at an intermediate position to the table and is pivotable within a horizontal plane, a cam lever that is disposed between the cylindrical cam and the pivot lever and is axially supported in an intermediate position thereof by the table, the cam lever having at one end thereof a cam follower that rotates over a cam face of the cylindrical cam by rotation of the table with another end thereof coming into contact with one end of the pivot lever, a third link that is provided more to an outer peripheral side of the table than the pivot lever and is linked at one end thereof to the table and pivotable within a horizontal plane, a fourth link that is linked at one end thereof to another end of the pivot lever and is linked at another end thereof to another end of the third link, and a pair of fifth links, each of which being linked at one end thereof to an intermediate position of the fourth link and linked at another end thereof to another end of each one of the first links; and when the cam follower of the cam lever rotates over the cam face of the cylindrical cam, drive force caused thereby is transmitted through the drive force transmission mechanism to the first link of the arm support mechanism.

7. The bag transfer device according to any of claims 1 to 5, wherein an even number of pairs of grippers are provided;

two adjacent pairs of grippers have a common drive force transmission mechanism;

a first connecting link is provided to connect:

the arm support mechanism of the gripper, which is of one pair of grippers of adjacent two pairs of grippers and on a downstream side of the movement path, to the arm support mechanism of the gripper, which is of another one pair of grippers of adjacent two pairs of grippers and on a downstream side of the movement path;

a second connecting link is provided to connect:

the arm support mechanism of the gripper, which is of one pair of grippers of adjacent two pairs of grippers and on an upstream side of the movement path, to the arm support mechanism of the gripper, which is of another one pair of grippers of adjacent two pairs of grippers and on an upstream side of the movement path; and two adjacent pairs of grippers are moved in a same manner.

8. The bag transfer device according to claim 6, wherein an even number of pairs of grippers are provided;

two adjacent pairs of grippers have a common drive force transmission mechanism;

a first connecting link is provided to connect:

the arm support mechanism of the gripper, which is of one pair of grippers of adjacent two pairs of grippers and on a downstream side of the movement path, to the arm support mechanism of the gripper, which is of another one pair of grippers of adjacent two pairs of grippers and on a downstream side of the movement path;

a second connecting link is provided to connect:

the arm support mechanism of the gripper, which is of one pair of grippers of adjacent two pairs of grippers and on an upstream side of the movement path, to the arm support mechanism of the gripper, which is of another one pair of grippers of adjacent two pairs of grippers and on an upstream side of the movement path; and two adjacent pairs of grippers are moved in a same manner.

* * * * *